(12) United States Patent
Bourne et al.

(10) Patent No.: US 10,962,139 B2
(45) Date of Patent: Mar. 30, 2021

(54) HANDWASHING VALVE STRUCTURE

(71) Applicant: Kohler Co., Kohler, WI (US)

(72) Inventors: James Bourne, Cheltenham (GB);
Robert Caldwell, Charlton Kings (GB);
Thomas Philip Perry, Cheltenham (GB); Adam Luke May, Bristol (GB)

(73) Assignee: KOHLER CO., Kohler, WI (US)

( * ) Notice: Subject to any disclaimer, the term of this patent is extended or adjusted under 35 U.S.C. 154(b) by 43 days.

(21) Appl. No.: 16/260,973

(22) Filed: Jan. 29, 2019

(65) Prior Publication Data
US 2019/0234527 A1    Aug. 1, 2019

Related U.S. Application Data

(60) Provisional application No. 62/624,906, filed on Feb. 1, 2018.

(51) Int. Cl.
*F16K 31/62* (2006.01)
*F16K 31/60* (2006.01)
(Continued)

(52) U.S. Cl.
CPC .............. *F16K 31/62* (2013.01); *A47K 1/02* (2013.01); *B65D 47/2012* (2013.01);
(Continued)

(58) Field of Classification Search
CPC ......... Y10T 137/0469; Y10T 137/9464; Y10T 137/86236; F16K 31/62; F16K 31/602; E03C 2001/026; E03C 1/02; E03C 1/04; E03C 1/0407; E03C 1/052; B67D 3/02; B65D 47/2012; B65D 47/248;
(Continued)

(56) References Cited

U.S. PATENT DOCUMENTS 1,248,251 A * 11/1917 Breaux .................. B67D 3/043
                                                        222/509
1,274,915 A *  8/1918 McEnery ........... B65D 83/0044
                                                        222/320
(Continued)

FOREIGN PATENT DOCUMENTS

KR        20150075214         7/2015

OTHER PUBLICATIONS

European Partial Search Report re EP Application 19154825.4; 34 pgs.

*Primary Examiner* — Matthew W Jellett
(74) *Attorney, Agent, or Firm* — Foley & Lardner LLP

(57) ABSTRACT

A handwashing valve structure includes a mounting structure, a dispensing structure, and a control structure. The mounting structure is configured to attach to a liquid vessel. The dispensing structure is configured to dispense a liquid from the liquid vessel and is movable between a closed position and an open position. The control structure is configured to move the dispensing structure between the closed position and the open position. The control structure is configured to be moved by pressure from a portion of a user's body to move the dispensing structure from the closed position to the open position. The dispensing structure is configured to automatically move from the open position to the closed position in the absence of any pressure from the portion of the user's body onto the control structure.

21 Claims, 16 Drawing Sheets

(51) Int. Cl.
  *E03C 1/05* (2006.01)
  *B67D 3/02* (2006.01)
  *A47K 1/02* (2006.01)
  *E03C 1/04* (2006.01)
  *B65D 47/20* (2006.01)
  *B65D 47/24* (2006.01)
  *B65D 47/28* (2006.01)
  *E03C 1/02* (2006.01)
  *A47K 3/28* (2006.01)

(52) U.S. Cl.
  CPC ......... *B65D 47/248* (2013.01); *B65D 47/249* (2013.01); *B65D 47/283* (2013.01); *B67D 3/02* (2013.01); *E03C 1/0407* (2013.01); *E03C 1/052* (2013.01); *F16K 31/602* (2013.01); *A47K 3/285* (2013.01); *E03C 2001/026* (2013.01); *Y10T 137/0469* (2015.04); *Y10T 137/86236* (2015.04); *Y10T 137/9464* (2015.04)

(58) Field of Classification Search
  CPC ...... B65D 47/249; B65D 47/283; A47K 1/02; A47K 3/285
  USPC ...................... 251/244; 222/322; 4/626, 627; 137/15.14, 315.01
  See application file for complete search history.

(56) References Cited

U.S. PATENT DOCUMENTS

| | | | | |
|---|---|---|---|---|
| 1,334,769 | A | | 3/1920 | McClain |
| 1,992,320 | A | * | 2/1935 | Maggenti ................ B65D 3/04 222/91 |
| 2,074,554 | A | | 3/1937 | Myron |
| 2,085,823 | A | * | 7/1937 | Mullett .................... A47K 5/10 222/309 |
| 3,107,828 | A | * | 10/1963 | Costakos ................ B67D 3/02 222/438 |
| 5,025,516 | A | * | 6/1991 | Wilson .................... E03C 1/057 250/221 |
| 5,199,119 | A | * | 4/1993 | Weber .................... E03C 1/052 251/295 |
| 5,230,365 | A | * | 7/1993 | Woltz .................... F16K 31/088 137/607 |
| 5,857,596 | A | * | 1/1999 | Lee ...................... B67D 3/0025 222/509 |
| 8,307,851 | B2 | * | 11/2012 | Warsowe ................ E03C 1/021 137/595 |
| 9,157,548 | B2 | * | 10/2015 | Walker .................. F16K 31/465 |
| 9,862,527 | B2 | * | 1/2018 | Marchitello ......... B65D 47/249 |
| 10,125,028 | B2 | * | 11/2018 | Lachermeier ........... C02F 1/283 |
| 10,337,662 | B1 | * | 7/2019 | Gradillas ................ B67D 3/02 |

* cited by examiner

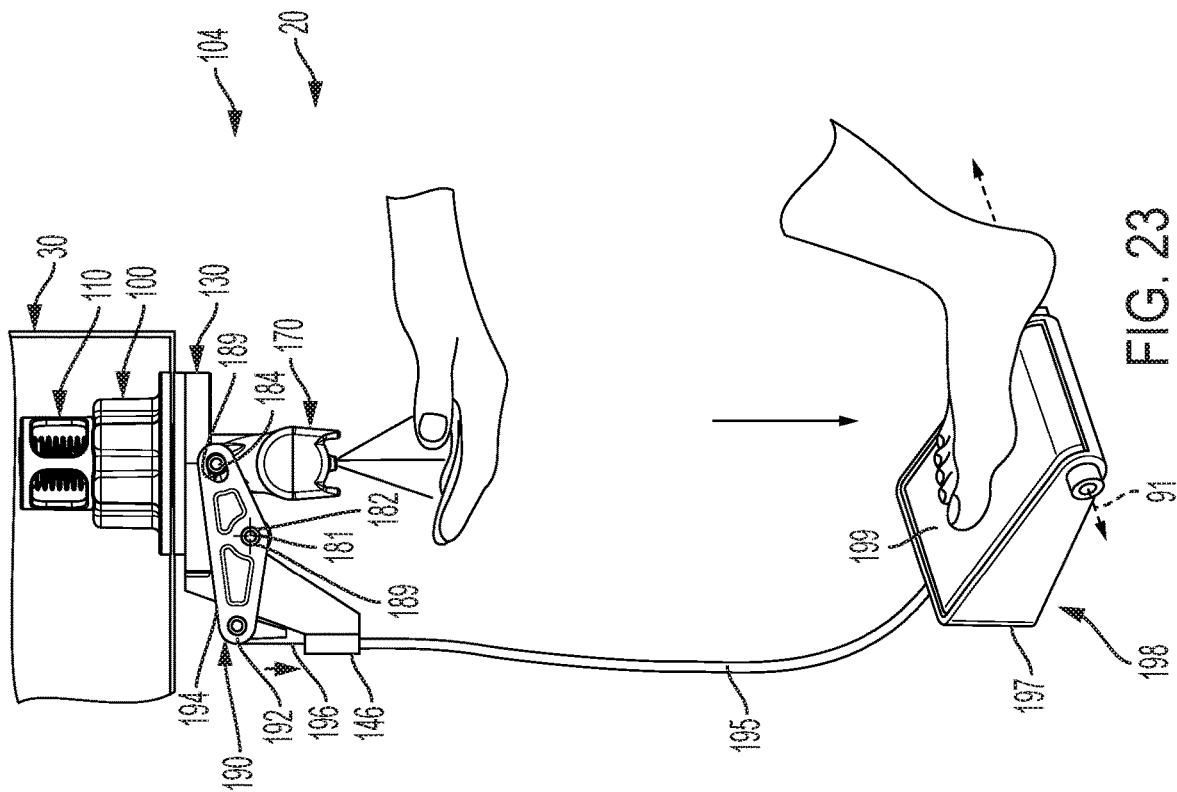
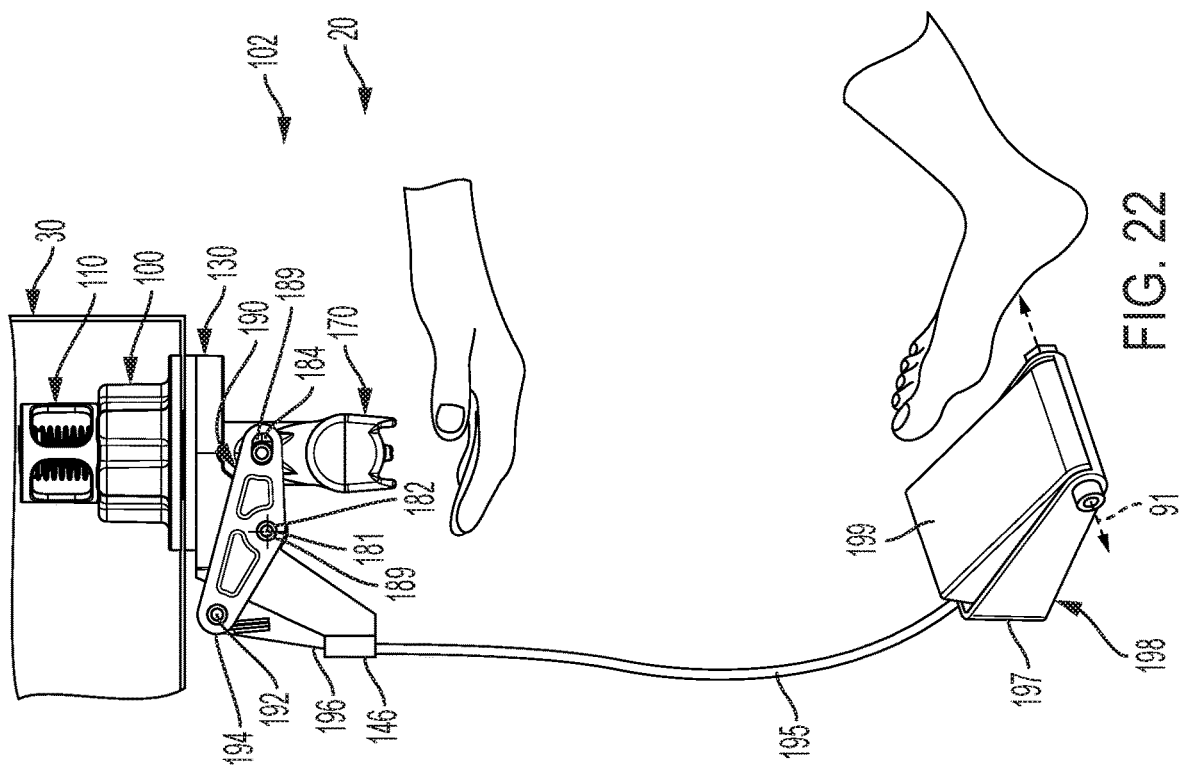

HANDWASHING VALVE STRUCTURE

CROSS-REFERENCE TO RELATED PATENT APPLICATIONS

This application claims priority to and the benefit of U.S. Provisional Patent Application No. 62/624,906, filed Feb. 1, 2018, the entire disclosure of which is incorporated herein by reference.

FIELD

The present invention relates generally to the field of handwashing valve structures.

BACKGROUND

In areas with limited amounts of water, it is imperative to conserve water as much as possible. However, it is also imperative to provide an easy and convenient way to wash people's hands without using too much water in order to prevent the spread of germs and infection.

SUMMARY

One embodiment relates to a handwashing valve structure that includes a mounting structure, a dispensing structure, and a control structure. The mounting structure is configured to attach to a liquid vessel. The dispensing structure is configured to dispense a liquid from the liquid vessel and is movable between a closed position in which liquid cannot flow through the valve structure and an open position in which liquid flows from the liquid vessel and through and out from the valve structure. The control structure is configured to move the dispensing structure between the closed position and the open position. The control structure is configured to be moved by pressure from a portion of a user's body to move the dispensing structure from the closed position to the open position. The dispensing structure is configured to automatically move from the open position to the closed position in the absence of any pressure from the portion of the user's body onto the control structure.

Another embodiment relates to a handwashing station that includes a liquid vessel configured to contain a liquid and a handwashing valve structure configured to attach to and dispense the liquid from the liquid vessel. The valve structure includes a mounting structure, a dispensing structure, and a control structure. The mounting structure is configured to attach to a liquid vessel. The dispensing structure is configured to dispense a liquid from the liquid vessel and is movable between a closed position in which liquid cannot flow through the valve structure and an open position in which liquid flows from the liquid vessel and through and out from the valve structure. The control structure is configured to move the dispensing structure between the closed position and the open position. The control structure is configured to be moved by pressure from a portion of a user's body to move the dispensing structure from the closed position to the open position. The dispensing structure is configured to automatically move from the open position to the closed position in the absence of any pressure from the portion of the user's body onto the control structure.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

FIG. 22 is a partially perspective, partially side, cross-sectional view of a valve structure according to another embodiment in a closed position.

FIG. 23 is a partially perspective, partially side, cross-sectional view of the valve structure of FIG. 22 in an open position.

DETAILED DESCRIPTION

Figure 1:
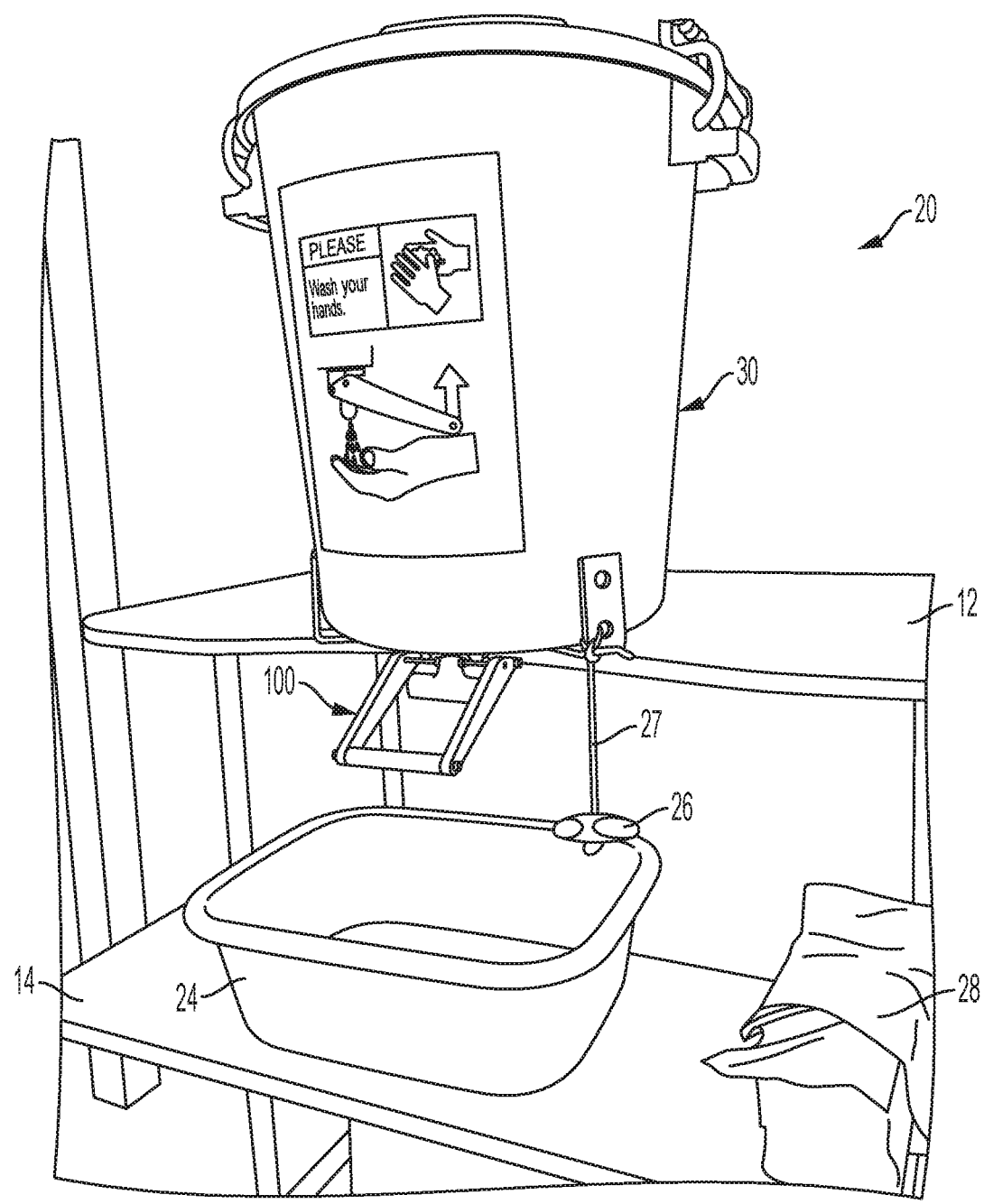
FIG. 1 is a perspective view of a handwashing station according to one embodiment.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is not defined by any particular embodiment described herein. Before turning to the figures, which illustrate exemplary embodiments in detail, it should be understood that the application is not limited to the details or methodology set forth in the description or illustrated in the figures. It should also be understood that the terminology is for the purpose of the descriptions only and should not be regarded as limiting.

Referring generally to the figures, disclosed herein is a handwashing station with a handwashing valve structure that provides an area for a user to easily, sanitarily, and hygienically wash their hands using minimal water. Accordingly, the handwashing station is particular useful in locations that do not have water plumbing, where water is scarce, and/or where water needs to be conserved. The handwashing station allows the user to easily access water, but does not let water run or be wasted while the user is not using the handwashing station or is scrubbing their hands or between uses in order to conserve water and reduce how much the handwashing station (specifically the water vessel) needs to be refilled with water. Furthermore, when in use, the handwashing station uses a minimum flow rate, while still ensuring that the user's hands are completely covered in water to further conserve the water. Accordingly, the handwashing station uses a minimum amount of water for a user to wash their hands while still allowing the user to completely and easily clean their hands. Since the handwashing station is wrist-activated (and/or foot-activated), the handwashing station reduces the spread of infection or bacteria and prevents the user's hands from being recontaminated when turning off the water flow.

Additionally, the handwashing station is easily adaptable to a variety of different environments and can utilize a variety of different water vessels. In order to be easily assembled and to reduce the cost (which is of particular importance in areas with scarce amounts of water), the number of components within the handwashing station is minimized. Furthermore, as described further herein, the configuration of the handwashing station (specifically the handwashing valve structure) discourages using the handwashing water as drinking water, which allows the handwashing station to be refilled with water that is not necessarily drinkable, thus increasing the adaptability to water with different degrees of cleanliness. Overall, the handwashing station is intuitively used such that users who are unfamiliar with the handwashing station can use the handwashing station without instructions or directions and is convenient such that users are more likely to wash their hands more frequently.

Handwashing Station

As shown in FIGS. 1-4, the handwashing station 20 provides an area for a user to wash their hands. The handwashing station 20 can be used within a variety of different areas in which handwashing is needed. For example, the handwashing station 20 can be used within bathrooms (and therefore located near a toilet, for example), kitchens (and therefore located near a food preparation station, for example), schools, health centers, and community centers.

The handwashing station 20 includes a water vessel 30 and a handwashing valve structure 100. The handwashing station 20 may also optionally include additional components, including but not limited to a liquid waste bin 24, soap 26, and hand towels 28.

The handwashing valve structure 100 is attached to the water vessel 30 (as described further herein) that may be placed on an upper surface 12, such a table, a counter, or a stand. The water vessel 30 is positioned such that the valve structure 100 hangs or extends off of the edge upper surface 12 such that liquid from the water vessel 30 can flow through the valve structure 100, onto the user's hands, and into the liquid waste bin 24. According, the liquid waste bin 24 is positioned directly below the valve structure 100 on a lower surface 14 (e.g., a lower table, a counter, or the floor) that is below the upper surface 12.

The liquid waste bin 24 is configured and positioned to capture dirty liquid from users washing their hands. Accordingly, the liquid waste bin 24 may be a variety of different kinds of buckets, receptacles, drums, or vessels (according to the user's preference and what is available to be used) that are configured to capture and contain a liquid.

Figure 3:
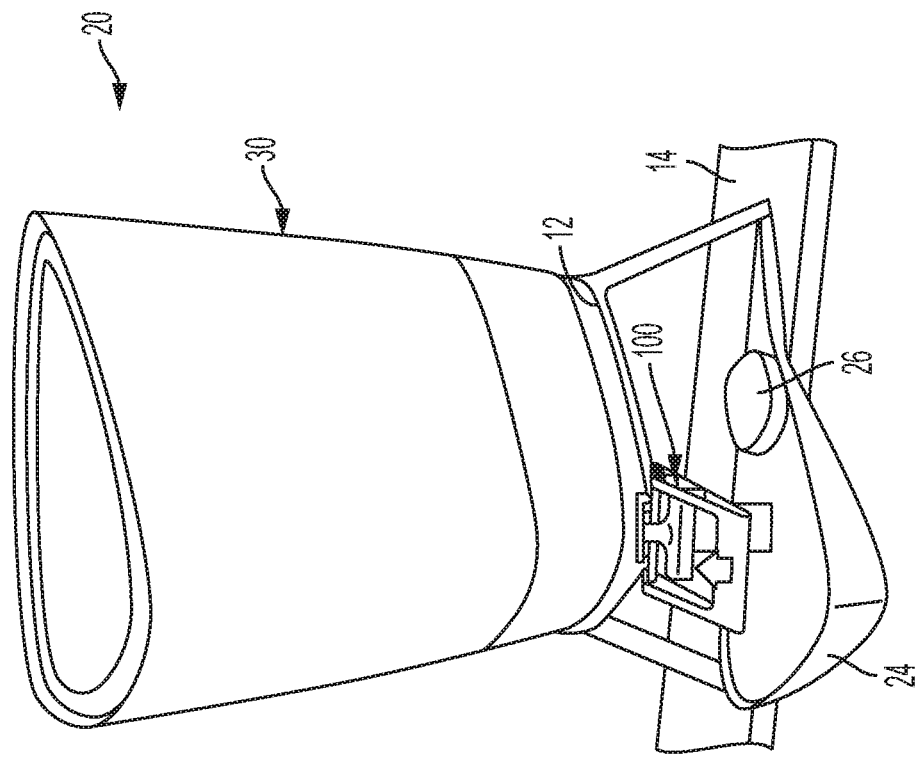
FIG. 3 is a perspective view of a handwashing station according to yet another embodiment.
Figure 2:
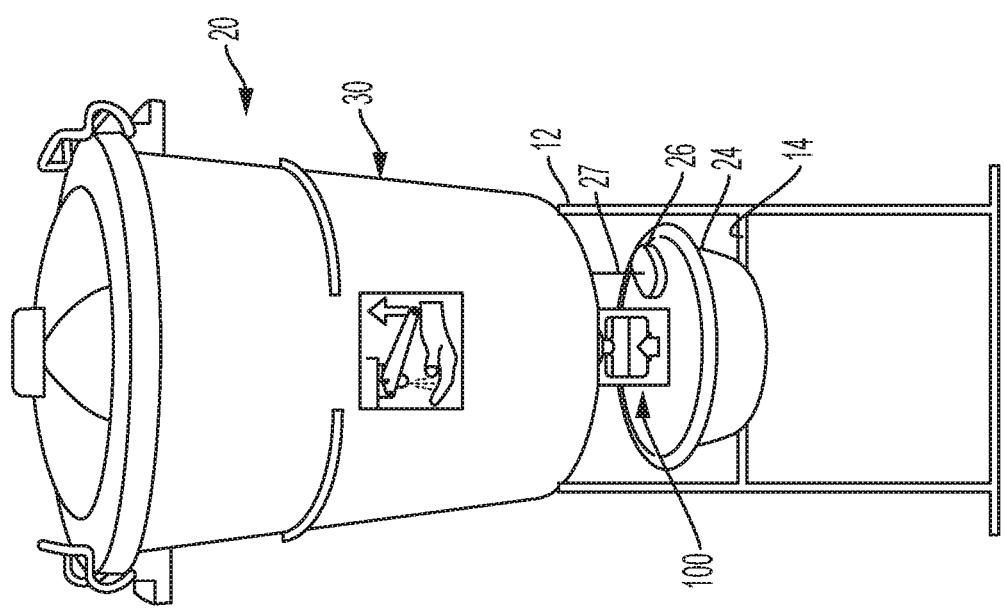
FIG. 2 is a perspective view of a handwashing station according to another embodiment.

Soap 26 (e.g., a bar of soap) (as shown in FIGS. 1-3) may be positioned near and conveniently to the water vessel 30 and the valve structure 100 in order to allow the user to easily access and use the soap while they are washing their hands. In order to keep the soap 26 near the water vessel 30 and the valve structure 100, the soap 26 may optionally be attached to the water vessel 30 with a rope or string 27 (as shown in FIGS. 1-2). Hand towels 28 (as shown in FIG. 1) may also be positioned near the water vessel 30 and the valve structure 100 (e.g., on the upper surface 12 or the lower surface 14) in order to allow the user to dry their hands after washing their hands.

Figure 4:
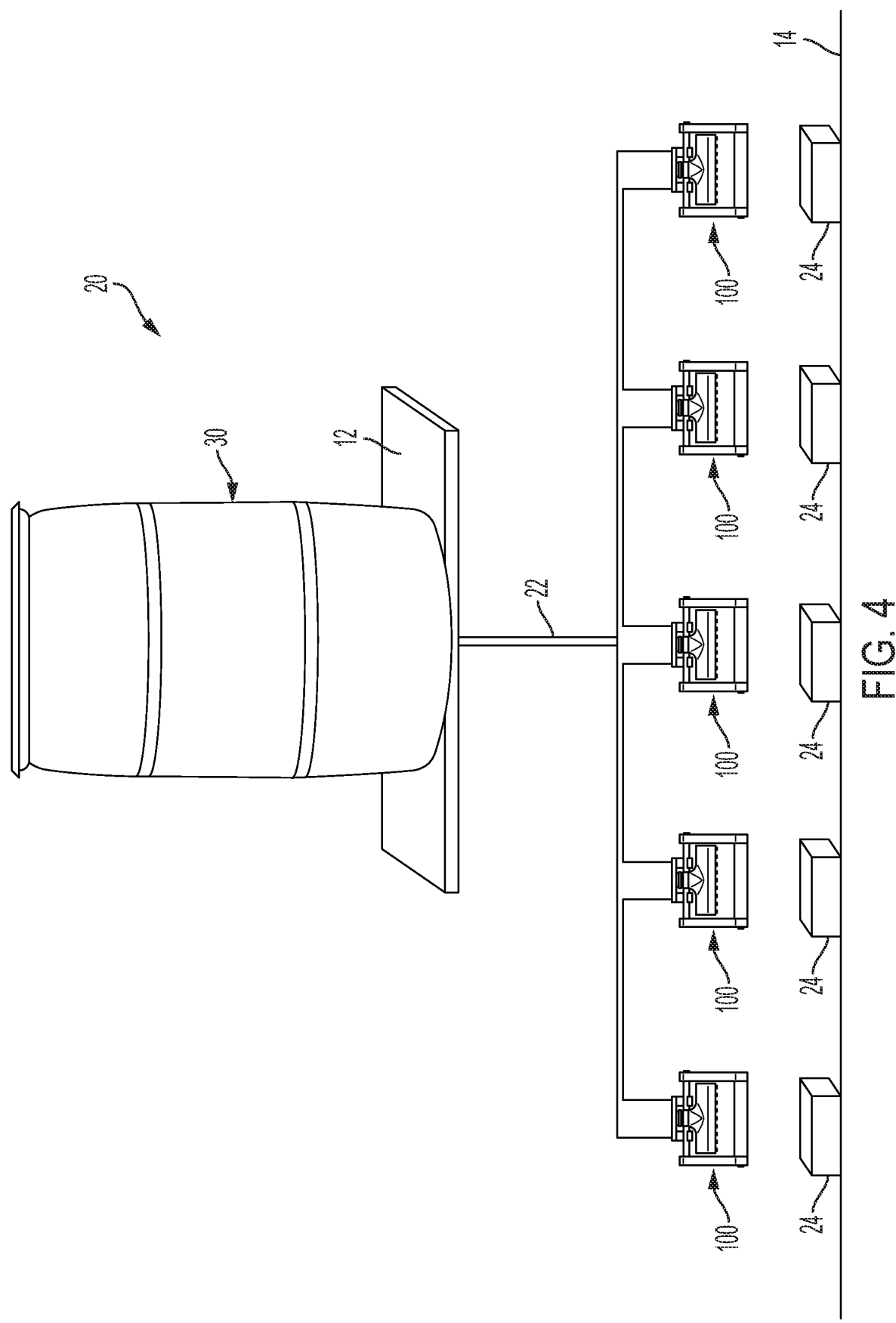
FIG. 4 is a perspective view of a handwashing station according to another embodiment.

According to one embodiment as shown in FIGS. 1-3, a single valve structure 100 is attached or mounted to one water vessel 30. According to another embodiment as shown in FIG. 4, multiple valve structures 100 are attached to and fed from one central water vessel 30 such that multiple people can wash their hands at the same time and each person has their own valve structure 100 to wash their hands under. A network of pipes 22 extends between and fluidly connects each of the valve structures 100 to the one water vessel 30. The exact configuration of the pipes 22 and the exact number of valve structures 100 may vary according to the desired configuration.

Water Vessel

As shown in FIGS. 1-6, the liquid vessel (e.g., the water bucket, receptacle, container, barrel, drum, or vessel 30) may be any variety of different containers that are configured to contain and store a liquid. Although water is referred to herein, it is understood that the water vessel 30 may store and release (via the valve structure 100) a variety of different liquids, such as soapy water. Due to the configuration and adaptability of the valve structure 100, the valve structure 100 can be attached to a wide variety of differently sized and shaped water vessels. Accordingly, a wide variety of different types of water vessels 30 may be used with the valve structure 100, according to the user's preference and what is available to be used. The size or capacity of the water vessel 30 may depend on what the handwashing station 20 is being used for (e.g., how many people will be using the handwashing station 20 and with what frequency, how often and easily the water vessel 30 can be refilled).

Figure 6:
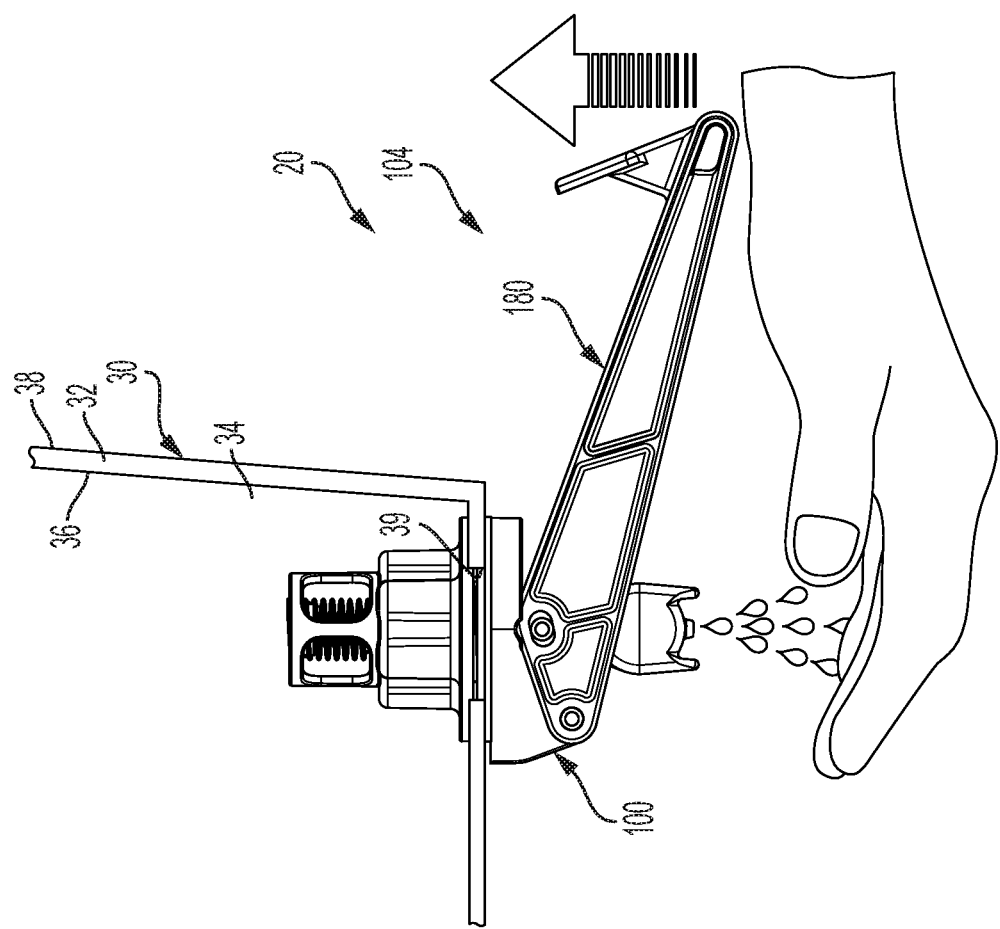
FIG. 6 is a cross-sectional, schematic view of the valve structure and the water vessel of FIG. 5.
Figure 5:
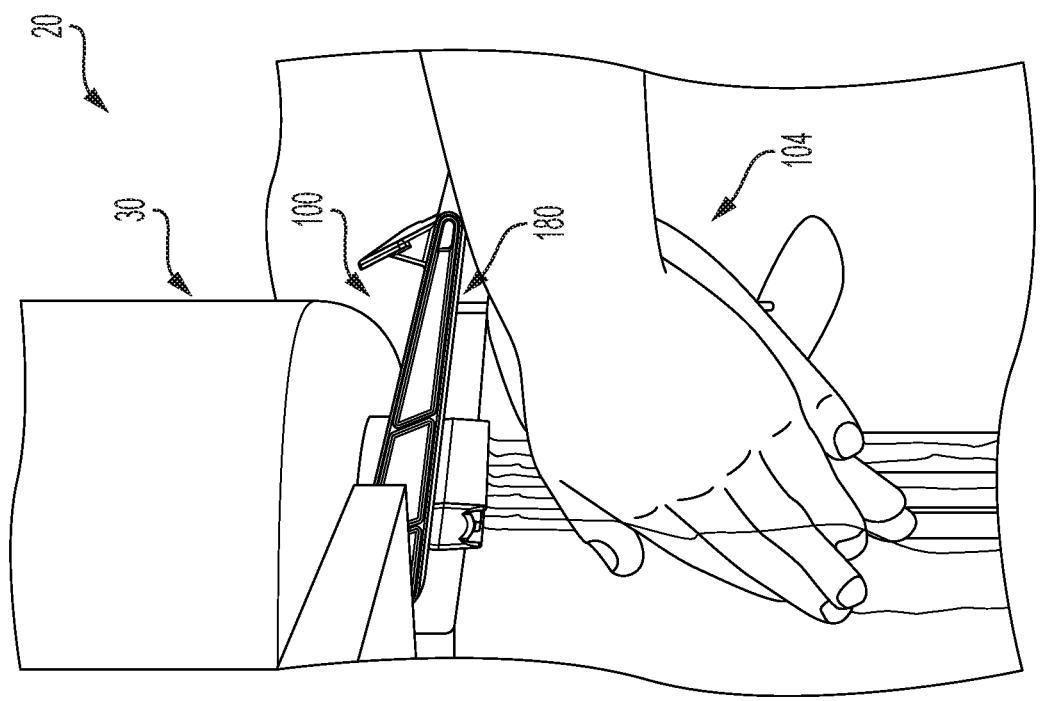
FIG. 5 is a perspective view of a handwashing station a handwashing valve structure and a water vessel according to another embodiment.

As shown in FIG. 5, the valve structure 100 is attached to the water vessel 30 such that, upon activation (as described further herein), liquid (i.e., water) can flow from within the water vessel 30 onto the user's hands. As shown in FIG. 6, the water vessel 30 includes a wall 32 that extends about the body of the water vessel 30 and defines an inner area 34 of the water vessel 30 that is configured to contain a liquid (i.e., water). The wall 32 has an inner surface 36 and an outer surface 38 that are substantially opposite each other. The inner surface 36 faces toward and defines the inner area 34 of the water vessel 30. The outer surface 38 faces away from the inner area 34 of the water vessel 30. In order to attach the valve structure 100 to the water vessel 30, an aperture or hole 39 (which may optionally be circular) is drilled or cut in a lower area of the water vessel 30, extending completely through the wall 32 (which may be, for example, a lower, bottom wall or a side wall). As described further herein, the valve structure 100 is positioned such that the valve structure 100 extends completely through the hole 39 of the water vessel 30. According to one embodiment, the diameter of the hole 39 is approximately 25 to 35 millimeters. Since the valve structure 100 may be attached to a wall 32 that is a bottom wall, at least a portion of the valve structure 100 may be positioned vertically below (and optionally directly underneath) the water vessel 30.

Handwashing Valve Structure

Figure 10:
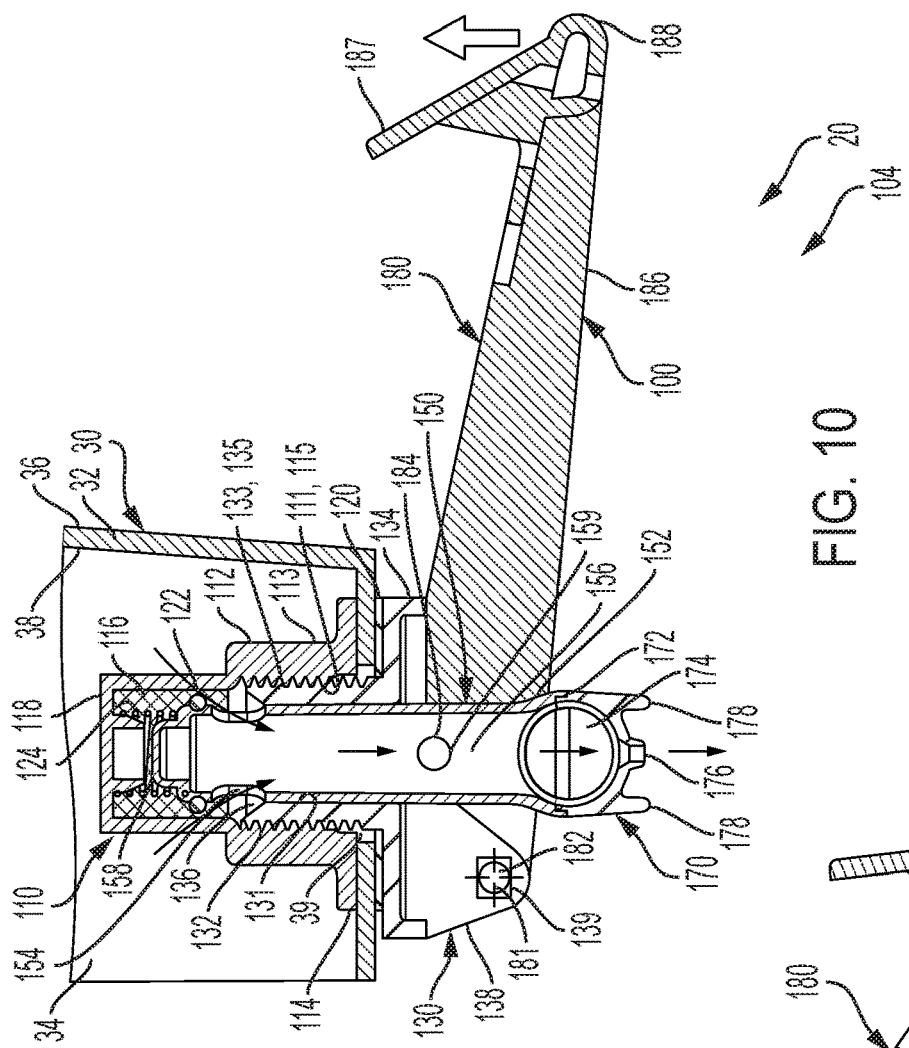
FIG. 10 is a cross-sectional view of the valve structure of FIG. 5 in an open position.
Figure 9:
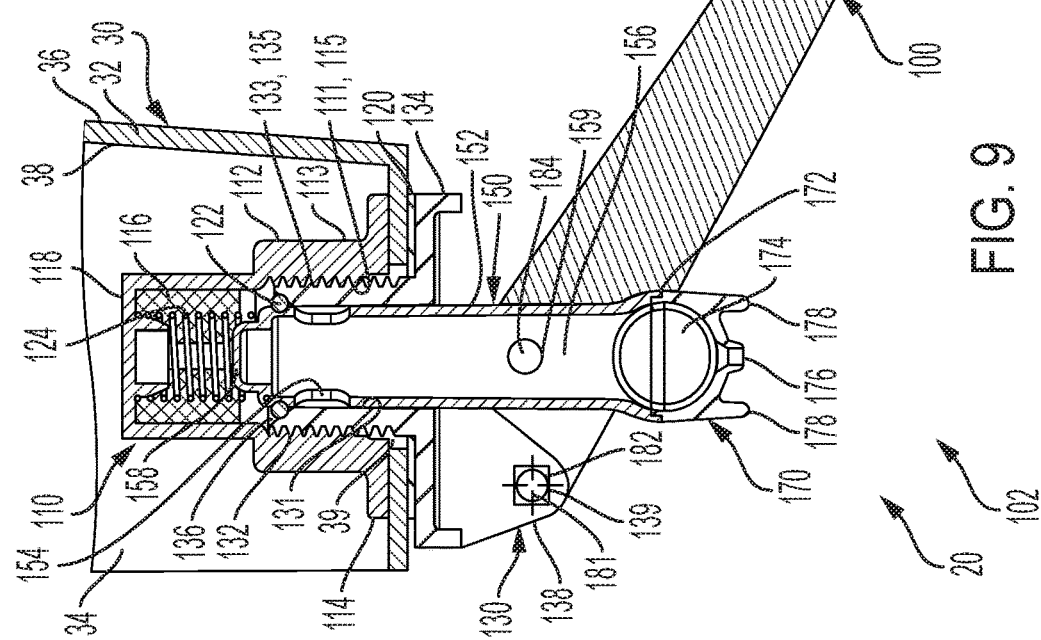
FIG. 9 is a cross-sectional view of the valve structure of FIG. 5 in a closed position.

As shown in FIGS. 5-6, the handwashing tap or valve structure 100 is configured to attach to a portion of and dispense water from the water vessel 30. The valve structure 100 allows a user to wash their hand(s) by releasing water from the water vessel 30 when the user presses against a control structure or portion of the valve structure 100 (e.g., pushes up on the handle structure 180 or depresses the foot pedal structure 190, as described further herein) and moves the valve structure 100 from a closed position 102 (as shown in FIG. 9 for example, in which liquid does not (and cannot) flow through the valve structure 100 and the user therefore cannot wash their hands) to an open position 104 (as shown in FIG. 10 for example, in which liquid flows from the water vessel 30 and through and out from the valve structure 100, which allows the user to wash their hands) (as shown and described further herein).

The valve structure 100 may be a purely mechanical structure (i.e., with no electrical components or connections to electricity). Accordingly, the valve structure 100 (in particular the dispensing structure) is configured to be moved between the closed position 102 and the open position 104 (both being moved from the closed position 102 to the open position 104 and moving itself from the open position 104 to the closed position 102) by only mechanical mechanisms (such as the control structure) and without any electrical assistance.

Due to the configuration of the valve structure 100, the valve structure 100 is self-closing such that the valve structure 100 (in particular the dispensing structure) will automatically move from the open position 104 to the closed position 102 in absence of any pressure from the portion of the user's body onto the control structure (e.g., once the user stops pressing against the control structure (i.e., moves their wrist away from the valve structure 100 (in particular the handle structure 180) or moves their foot away from the foot pedal structure 190)). This configuration minimizes the amount of water that is wasted and reduces the spread of germs and infection (since the user does not have to touch the valve structure 100 with their hands after washing their hands in order to turn the valve structure 100 off). Accordingly, the valve structure 100 conserves water since the water is not running (and being wasted) when the user is not actively using the valve structure 100 (e.g., while applying soap to their hands).

Furthermore, the valve structure 100 is configured to be activated (i.e., moved from the closed position 102 to the open position 104) and operated by a portion of the user's body other than their hands (i.e., their wrists and/or foot, as described further herein) (i.e., the user can move the valve structure 100 to the open position 104 with their wrists (and/or foot) to wash their hands). This configuration further helps control and reduce the spread of germs and infection since the user does not need to use their hands to turn on/off the valve structure 100 (i.e., to move the valve structure 100 between the open position 104 and the closed position 102), which could recontaminate the user's hands (in particular after washing). Even further, the valve structure 100 disperses the water such that only a low flow rate of water is needed (while still adequately covering the user's hands) and thereby provided, which conserves the amount of water used.

Figure 7:
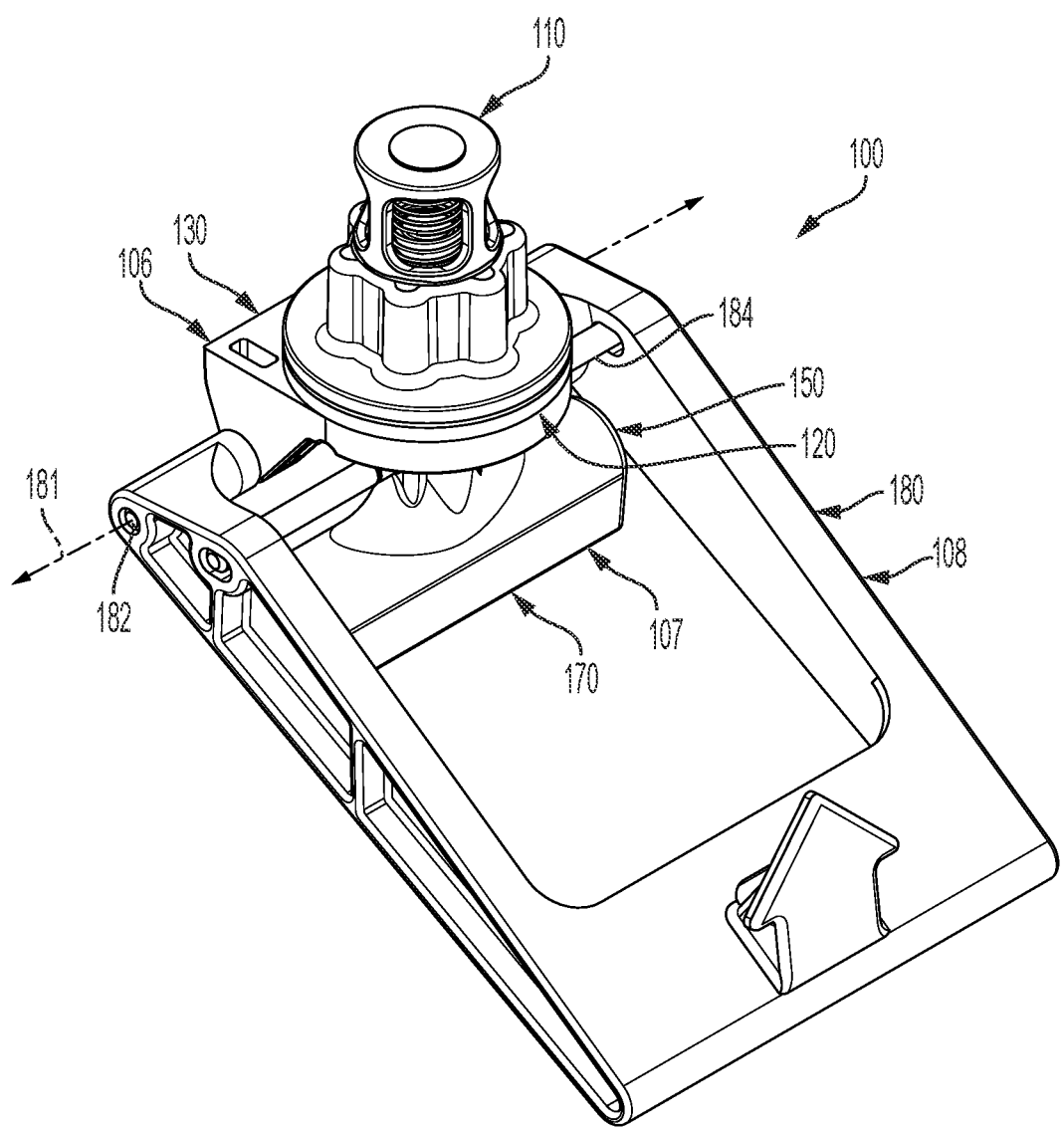
FIG. 7 is a perspective view of the valve structure of FIG. 5.
Figure 8:
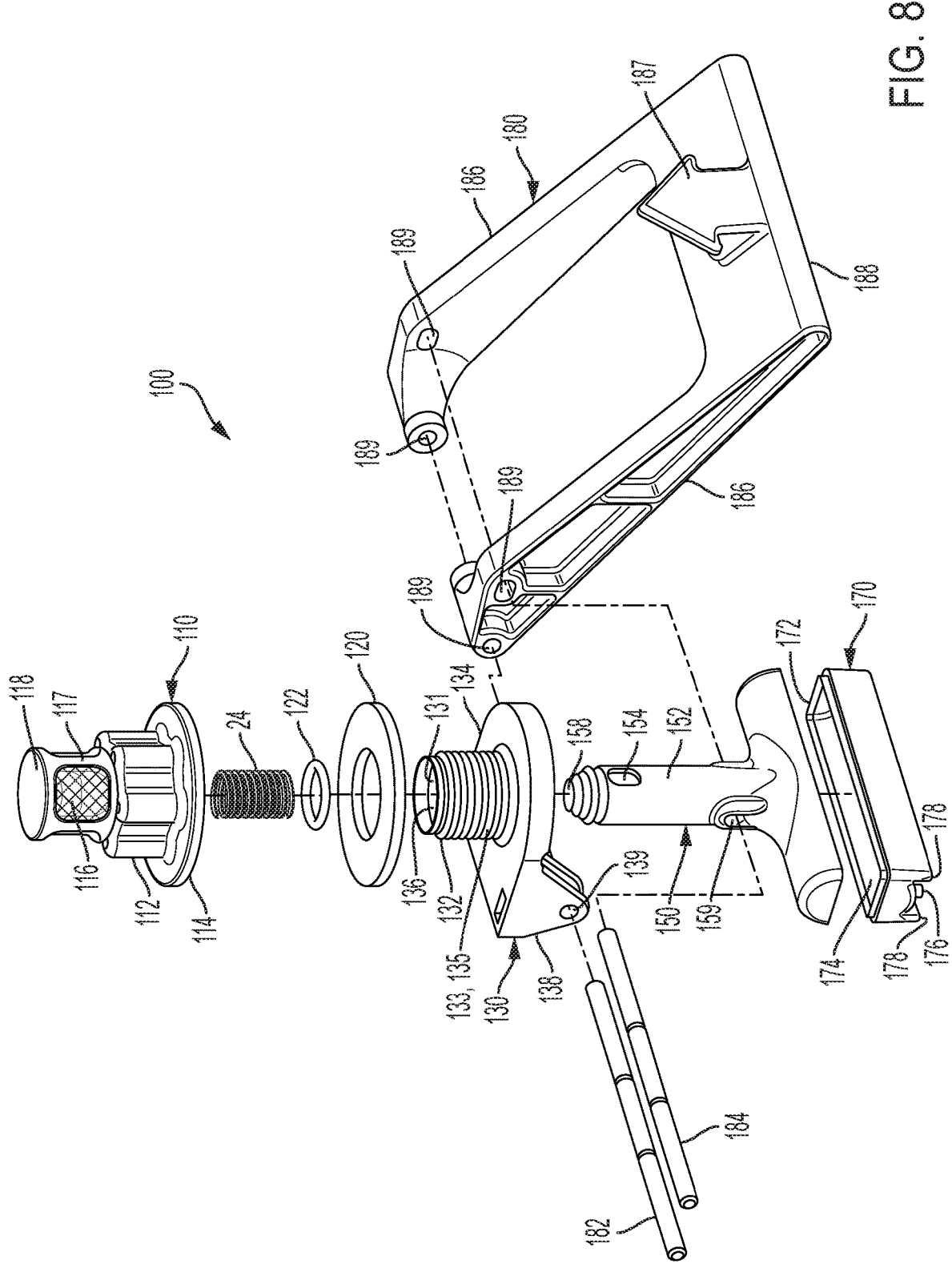
FIG. 8 is an exploded view of the valve structure of FIG. 5.

As shown in FIGS. 7-10, the valve structure 100 includes a variety of different components such as a mounting structure 106, a dispenser 107 (referred to herein as the dispensing structure), and a controller 108 (referred to herein as the control structure) (which are labeled in FIG. 7). The mounting structure is configured to attach the rest of the valve structure 100 to the water vessel 30 and comprises an upper mounting structure 110, a lower mounting structure 130, and a gasket 120. The dispensing structure is configured to dispense the water from the water vessel 30 and is movable between the closed position 102 and the open position 104. The dispensing structure comprises a piston 150 and a nozzle structure 170. The control structure is configured to move the dispensing structure between the closed position 102 and the open position 104 and comprises a handle structure 180 and/or a foot pedal structure 190 (as shown and described further herein). According to one embodiment as shown in FIGS. 8-10, the valve structure 100 may also include a spring 124.

The various components of the valve structure 100 may be made out of a variety of different materials, according to what is available and what is most cost effective or cheapest. For example, the majority of the valve structure 100 may be constructed out of plastic. However, it is understood that the rotational rod 182 and the piston rod 184 (as described further herein) may be constructed out of metal (e.g., stainless steel) for additional strength. Furthermore, at least portions of the handle structure 180 (i.e., the lift arm 186 and/or the handle 188, as described further herein) may be constructed out of metal in order to have a sufficient weight, which allows the valve structure 100 to have a proper weight distribution and allows the valve structure 100 to close automatically (as described further herein).

The valve structure 100 may have a relatively small number of parts to be assembled together in order to reduce the number of parts and to make the valve structure 100 easier and less expensive to manufacture.

Upper Mounting Structure

As shown in FIGS. 9-10, the upper mounting structure 110 (with the lower mounting structure 130) of the mounting structure attaches the rest of the valve structure 100 to the water vessel 30 (as described further herein). In particular, the mounting structure (i.e., the upper mounting structure 110 and/or the lower mounting structure 130) is configured to extend at least partially through the hole 39 in the wall 32 of the water vessel 30. Accordingly, the upper mounting structure 110 and the lower mounting structure 130 are configured to sandwich (and extend along opposite sides of) at least a portion of the wall 32 of the water vessel 30 and attach to each other.

Accordingly, as shown in FIGS. 9-10, the upper mounting structure 110 (e.g., a back nut filter structure) is configured to be positioned at least partially (or completely) within the inner area 34 of the water vessel 30. As shown in FIGS.

8-12, the upper mounting structure 110 includes a fastener portion 112, a lower wall 114, a filter 116, and an upper wall 118.

The fastener portion 112 is a lower portion of the upper mounting structure 110 that is configured to receive and attach to the upper attachment portion 132 of the lower mounting structure 130 (as described further herein), as shown in FIGS. 9-10. Accordingly, as shown in FIGS. 9-12, the fastener portion 112 includes an inner surface 111 and an outer surface 113 that are substantially opposite each other and define a receptacle or hollow portion that is configured to receive the upper attachment portion 132 of the lower mounting structure 130 and allows liquid to flow through the fastener portion 112.

The inner surface 111 of the fastener portion 112 directly attaches to the upper attachment portion 132 of the lower mounting structure 130 and retains the lower mounting structure 130 through a variety of different mechanisms, such as a friction fit along a relative smooth inner surface of the fastener portion 112 or with a threaded attachment (as shown in FIGS. 9-10) in order to attach the valve structure 100 to the water vessel 30. Accordingly, as shown in FIGS. 9-10, the fastener portion 112 may include internal threads 115 that extend along the inner surface 111 and are configured to attach to or screw onto complementary threads 135 on the outer surface 133 of the lower mounting structure 130.

The outer surface 113 of the fastener portion 112 includes bumps or ridges which allows the person assembling the valve structure 100 to firmly grasp or grip the outside of the upper mounting structure 110 in order to, for example, attach the upper mounting structure 110 to the lower mounting structure 130 and tighten the upper mounting structure 110 to the lower mounting structure 130 (as described further herein).

The lower wall 114 of the upper mounting structure 110 is positioned along the lower end of the fastener portion 112. The lower wall 114 is configured to directly abut against the inner surface 36 of the water vessel 30 (as shown in FIGS. 9-10). In order to increase the stability of the valve structure 100 attached to the water vessel 30, the lower wall 114 has a larger diameter than the rest of the upper mounting structure 110, which increases the amount of surface contact between the upper mounting structure 110 and the water vessel 30 (and therefore the amount of the wall 32 of the water vessel 30 that is sandwiched between the upper mounting structure 110 and the lower mounting structure 130) without needlessly increasing the materials for the upper mounting structure 110. In order to prevent the upper mounting structure 110 from moving through the hole 39 of the water vessel 30, the diameter of the lower wall 114 is larger than the diameter of the hole 39 of the water vessel 30.

The filter 116 of the upper mounting structure 110 of the mounting structure is configured to filter the liquid in the water vessel 30 in order to protect the seal member 122 within the valve structure 100, allow the seal member 122 to properly seal, and prevent debris from clogging other portions of the valve structure 100 (such as the nozzles 176). Since the configuration of the valve structure 100 (in particular the nozzle structure 170, as described further herein) discourages using the water in the water vessel 30 for drinking, the filter 116 does not have to clean the water in order to be drinkable (although the filter 116 may be configured to clean the water to be drinkable). The filter 116 is positioned along the upper end of the fastener portion 112 (i.e., opposite the lower wall 114) such that liquid flows from the water vessel 30, through the filter 116 first, and then into and through the fastener portion 112 (and subsequently through the rest of the valve structure 100, as described further herein). The filter 116 may be a variety of different types of filters, such as a mesh filter. The filter 116 may be constructed out of, for example only, stainless steel. A filter support 117 may extend along at least a portion of the perimeter and the height of the filter 116 in order to provide rigid support to the filter 116 to prevent the filter 116 from bending. The filter support 117 may be positioned inside of, outside of, or along the side of the filter 116 and has at least one orifice to allow liquid to pass completely through the filter 116.

Figure 12:
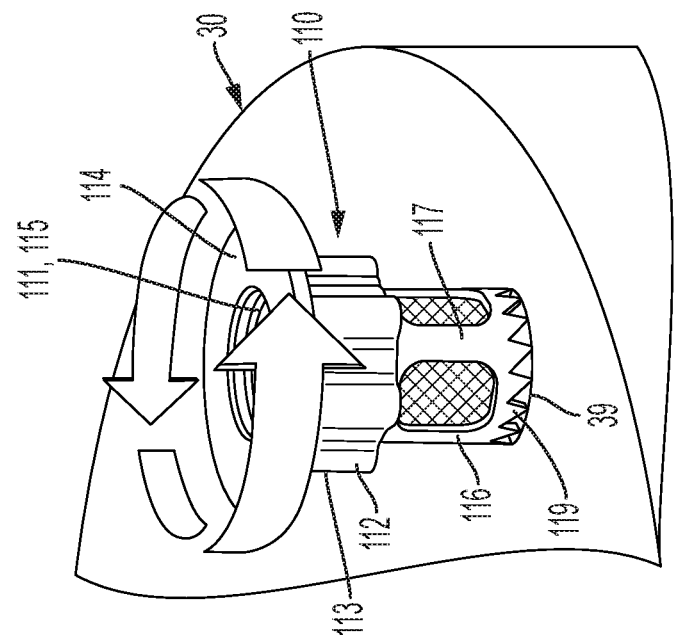
FIG. 12 is a perspective view of the upper mounting structure of FIG. 11 forming a hole in the water vessel.
Figure 11:
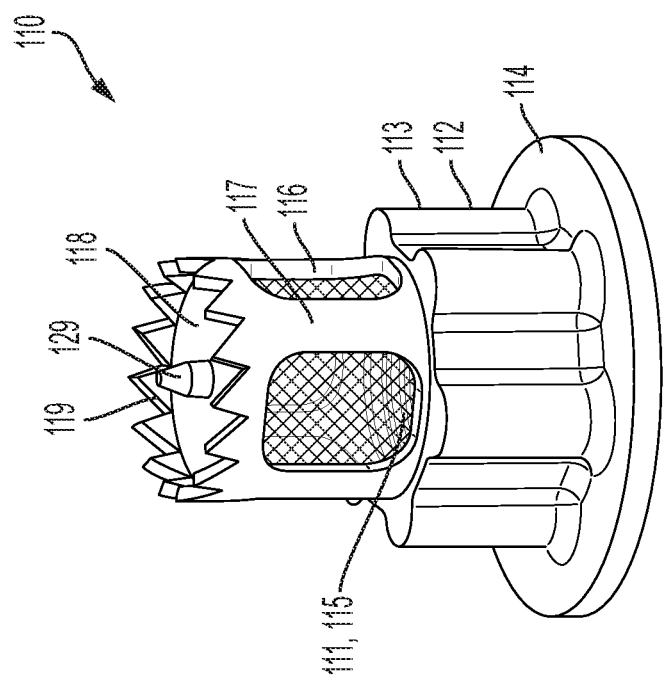
FIG. 11 is a perspective view of an upper mounting structure of a valve structure according to one embodiment.

The upper wall 118 of the upper mounting structure 110 is positioned along an upper end of the filter 116 (i.e., opposite the fastener portion 112 and optionally above the filter 116) and provides an upper support for the upper mounting structure 110. According to one embodiment as shown in FIGS. 11-12, the upper mounting structure 110 of the mounting structure includes a hole-perforation feature 119 (e.g., a serrated or sharp edge that extends in a circle) positioned along and extending above the upper wall 118 that is configured to saw or cut the hole 39 in the water vessel 30 (without any other devices, such as a drill) before attaching or installing the valve structure 100 to the water vessel 30, as shown in FIG. 12. The hole-perforation feature 119 ensures that the hole 39 formed in the water vessel 30 is correctly sized in order to properly fit with the valve structure 100. The hole-perforation feature 119 may extend along a portion of the upper wall 118 or along the entire perimeter of the upper wall 118. Alternatively, the hole-perforation feature 119 may be positioned along a top portion of the lower mounting structure 130. However, as shown in the embodiment in FIG. 8, the upper mounting structure 110 does not have to include the hole-perforation feature 119.

As shown in FIG. 11, the upper mounting structure 110 may also optionally include a centering feature 129 that allows the person installing the valve structure 100 to more easily and accurately center the hole-perforation feature 119 of the upper mounting structure 110 in the desired location on the water vessel 30 in order to cut out the hole 39. The centering feature 129 may also help keep the upper mounting structure 110 more stable while the hole 39 is being cut (for example, the centering feature 129 may be inserted into a pilot divot in the wall 32 of the water vessel 30). In particular, the centering feature 129 may be a protrusion or extension that extends upwardly from the upper wall 118 of the upper mounting structure 110. The centering feature 129 is approximately the same height (above the upper wall 118) as the hole-perforation feature 119. The centering feature 129 is located along a center point of the upper wall 118, centered within an area defined by the hole-perforation feature 119. Therefore, the tip of the centering feature 129 is configured to be aligned with the center of the hole 39 in the wall 32 that is formed by the hole-perforation feature 119.

Each of the components of the upper mounting structure 110 (except for the filter 116) may be integral with each other and constructed as a single-piece such that the upper mounting structure 110 (optionally except for the filter 116) is a single unitary component that cannot be separated without destruction. The filter 116 may be integrated with or a separate component from the body of the upper mounting structure 110.

Lower Mounting Structure

As shown in FIGS. 9-10, the lower mounting structure 130 (with the upper mounting structure 110) of the mounting structure attaches the rest of the valve structure 100 to the water vessel 30 (as described further herein). Accordingly, as shown in FIGS. 9-10, the lower mounting structure 130 (e.g., a mounting manifold structure) is configured to be positioned partially outside of the water vessel 30 and partially within the inner area 34 of the water vessel 30 (and within the upper mounting structure 110). As shown in FIGS. 8-12, the lower mounting structure 130 includes an upper attachment portion 132, a base 134, a central passage 136, and a control attachment portion 138.

The upper attachment portion 132 is an upper portion of the lower mounting structure 130 that is configured to be inserted into and received by the fastener portion 112 of the upper mounting structure 110, as shown in FIGS. 9-10. Accordingly, as shown in FIGS. 8-10, the upper attachment portion 132 includes an outer surface 133 and an inner surface 131 that are substantially opposite each other and allow the lower mounting structure 130 to attach to the upper mounting structure 110.

The outer surface 133 of the upper attachment portion 132 of the lower mounting structure 130 directly attaches to the fastener portion 112 of the upper mounting structure 110 and is retained by the upper mounting structure 110 through a variety of different mechanisms, such as a friction fit along a relative smooth outer surface of the upper attachment portion 132 or with a threaded attachment (as shown in FIGS. 9-10) in order to attach the valve structure 100 to the water vessel 30. Accordingly, as shown in FIGS. 9-10, the upper attachment portion 132 may include external threads 135 that extend along the outer surface 133 and are configured to attach to or screw into complementary threads 115 on the inner surface 111 of the fastener portion 112 of the upper mounting structure 110.

The inner surface 131 of the upper attachment portion 132 of the lower mounting structure 130 is substantially smooth in order to allow the piston 150 to move within and along the upper attachment portion 132 along and through the central passage 136 (as described further herein).

The base 134 of the lower mounting structure 130 is positioned along a lower end of the upper attachment portion 132 and is configured to directly or indirectly abut against the outer surface 38 of the water vessel 30 (as shown in FIGS. 9-10). In order to increase the stability of the valve structure 100 attached to the water vessel 30, the base 134 has a larger diameter than the rest of the lower mounting structure 130, which increases the amount of surface contact between the lower mounting structure 130 and the water vessel 30 (and therefore the amount of the wall 32 of the water vessel 30 that is sandwiched between the upper mounting structure 110 and the lower mounting structure 130) without needlessly increasing the materials for the lower mounting structure 130. In order to prevent the lower mounting structure 130 from moving through the hole 39 of the water vessel 30, the diameter of the base 134 is larger than the diameter of the hole 39 of the water vessel 30.

The upper attachment portion 132 and the base 134 together define a central hollow portion, aperture, or passage 136 that extends completely through the lower mounting structure 130 and the base 134. The central passage 136 provides an area for the piston 150 to move within and along (as described further herein) and allows liquid to flow from the water vessel 30, into and through the upper mounting structure 110, and through the lower mounting structure 130.

The control structure attachment portion (referred to herein as the control attachment portion 138) of the lower mounting structure 130 extends from a lower surface of the base 134 and provides an area for the control structure (i.e., the handle structure 180 and/or the foot pedal structure 190) to movably attach to the lower mounting structure 130. Accordingly, the control attachment portion 138 includes at least one attachment notch or aperture 139 that a portion of the control structure (e.g., the rotational rod 182) can attach to or extend through. Optionally, the control attachment portion 138 may extend from two opposite sides of the base 134 and thus includes two attachment apertures 139 that are aligned with each other along their length such that the rotational rod 182 can extend through the two attachment apertures 139 of the control attachment portion 138 for greater stability.

Each of the components of the lower mounting structure 130 may be integral with each other and constructed as a single-piece such that the lower mounting structure 130 is a single unitary component that cannot be separated without destruction.

Gasket

The mounting structure of the valve structure 100 may optionally include a gasket 120 that is positioned between the top surface of the base 134 of the lower mounting structure 130 and the outer surface 38 of the water vessel 30 and extends around the hole 39 of the water vessel 30 (and around the central passage 136 of the lower mounting structure 130). The gasket 120 allows the valve structure 100 to more firmly and sealably attach to the wall 32 of the water vessel 30 by compressing the gasket 120 against the outer surface 38 of the water vessel 30. In order to seal to the water vessel 30, the gasket 120 may be constructed out of, for example, foam, rubber, or another suitable material.

Piston

The dispensing structure includes the piston 150 in order to control the fluid flow (i.e., prevent or allow the flow of fluid through the valve structure 100). In particular, the piston 150 (e.g., the flow tube, sliding piece, shuttle, or cylindrical part) is configured to be moved by the control structure within a portion of the valve structure 100 (i.e., within the mounting structure) in order to allow liquid to flow through the valve structure 100 (i.e., when the valve structure 100 is in the open position 104) or prevent liquid from flowing through the valve structure 100 (i.e., when the valve structure 100 is in the closed position 102), as described further herein. Specifically, the piston 150 is positioned and movable or slidable within the central passage 136 of the lower mounting structure 130 and within the space defined by the filter 116 of the upper mounting structure 110 (i.e., the area beneath the lower surface of the upper wall 118 of the upper mounting structure 110 and on the clean side of the filter 116).

As shown in FIGS. 8-10, the piston 150 has a side wall 152 and an upper wall 158. The side wall 152 extends in a substantially circular manner and thereby defines the substantially hollow, cylindrical shape of the piston 150. As shown in FIGS. 9-10, the side wall 152 defines a central passage 156 that extends along a portion of the length of the piston 150 that liquid can flow within and through. The upper wall 158 is positioned along and closes off the top of the side wall 152, and the bottom of the side wall 152 is substantially open such that liquid cannot flow through the top of the piston 150, but can flow through the bottom of the piston 150.

The top portion of the side wall 152 includes at least one orifice or flow aperture 154 that extends through the side wall 152 of the piston 150 and fluidly connects to the central passage 156 of the side wall 152. The flow aperture 154 is positioned toward the top end of the side wall 152 (but below the upper wall 158) such that liquid can flow into the piston 150 toward the top of the piston 150 (in the open position 104).

The piston 150 includes a seal member 122 positioned along the outside of the side wall 152 in order to allow the piston 150 to seal with other areas of the valve structure 100 (in particular the mounting structure) to prevent leakage and/or to close off the valve structure 100. For example, as shown in FIG. 9, the seal member 122 is positioned along a top portion of the piston 150 (i.e., below the upper wall 158 and above the flow aperture 154) in order to seal the top of the piston 150 to a top portion of the central passage 136 of the lower mounting structure 130 in the closed position 102. Accordingly, the seal member 122 prevents liquid from flowing into the piston 150 when the valve structure 100 is in the closed position 102. Furthermore, the seal member 122 prevents the piston 150 from falling out of or detaching from the lower mounting structure 130.

The piston 150 may optionally include other seal members in order to seal portions of the piston 150 to other areas of the valve structure 100 such as to a bottom portion of the central passage 136 of the lower mounting structure 130 (to prevent liquid from leaking along the outside of the piston 150 when the valve structure 100 is in the open position 104) or to the nozzle structure 170 (to prevent liquid from leaking out of the top of the nozzle structure 170).

Accordingly, as described further herein, when the valve structure 100 is in the open position 104, liquid from the water vessel 30 can flow through the filter 116 of the upper mounting structure 110 (into the central area of the upper mounting structure 110), into and through the flow apertures 154 of the piston 150, through the central passage 156 of the piston 150, and out the end of the piston 150 (and into the nozzle structure 170, as described further herein). When the valve structure 100 is in the closed position 102, the seal member 122 seals with the inner surface of the lower mounting structure 130 (along the central passage 136) and thus prevents liquid from the water vessel 30 from flowing into the piston 150 (through the flow aperture 154) and thus from flowing out through the nozzle structure 170.

The bottom of the side wall 152 may extend along the length and width of the nozzle structure 170 such that the opening at the bottom of the side wall 152 is relatively large (compared to the upper portion of the side wall 152). The bottom of the side wall 152 is configured to attach to and align with the upper attachment portion 172 of the nozzle structure 170. Accordingly, the bottom of the side wall 152 and the upper attachment portion 172 of the nozzle structure 170 are complementary to each other.

The side wall 152 also includes at least one attachment aperture 159 that a portion of the control structure (e.g., the piston rod 184) can attach to or extend through. Optionally, the side wall 152 may include two attachment apertures 159 that are aligned with each other along their length such that the piston rod 184 can extend through both of the two attachment apertures 159 of the piston 150 for greater stability. By receiving the piston rod 184, the piston 150 can be moved up and down (between the closed position 102 and the open position 104) by the control structure.

Spring

According to one embodiment as shown in FIGS. 8-10, the valve structure 100 includes the spring 124 to provide an additional force to bias the valve structure 100 (in particular the dispensing structure) to move from the open position 104 into the closed position 102. The spring 124 is positioned between the mounting structure and the control structure. In particular, the spring 124 is positioned directly beneath the lower surface of the upper wall 118 of the upper mounting structure 110 (i.e., within space defined by the filter 116) and directly above (and along the upper surface of) the upper wall 158 of the piston 150.

In order to bias the valve structure 100 to move into the closed position 102, the spring 124 is a compression spring that is biased to move into an expanded state. Accordingly, the spring 124 continually presses against and pushes apart the lower surface of the upper wall 118 of the upper mounting structure 110 and the upper surface of the upper wall 158 of the piston 150, which moves the valve structure 100 toward and into the closed position 102. Since the weight of the handle structure 180 and the weight of the liquid in the water vessel 30 also work to move the valve structure 100 into the closed position 102, the spring 124 provides assistance in moving the valve structure 100 into the closed position 102 and maintaining the valve structure 100 sealed in the closed position 102.

However, the valve structure 100 does not have to include the spring 124 in order to properly function. Furthermore, the exact position of the spring 124 may vary according to various embodiments.

Nozzle Structure

The dispensing structure includes the nozzle structure 170 in order to release the water from the water vessel 30 in a particular manner. The nozzle structure 170 of the valve structure 100 is configured to spray or release out liquid from the valve structure 100 and onto the hands of the user (when in the open position 104). As shown in FIG. 10 (as well as FIG. 20), any liquid that flows through the central passage 156 of the piston 150 flows directly into the nozzle structure 170. As shown in FIGS. 9-10, the nozzle structure 170 is statically attached to the piston 150 such that the nozzle structure 170 moves with the piston 150 as the valve structure 100 moves between the closed position 102 and the open position 104.

The nozzle structure 170 is approximately cylindrical and relatively long and narrow along a horizontal plane. In particular, the nozzle structure 170 includes a horizontal length and a horizontal width. The horizontal length is substantially larger than the horizontal width. Accordingly, the nozzle structure 170 is relatively long in a horizontal direction substantially parallel to the rotational axis 181 (as shown in FIGS. 7 and 9-10) of the control structure and relatively narrow in a horizontal direction substantially perpendicular to the rotational axis 181 (as described further herein).

The nozzle structure 170 (e.g., the spray bar) includes walls that define an upper attachment portion 172, a central passage 174, and at least one nozzle 176 (preferably a plurality of nozzles 176). As shown in FIGS. 9-10 (and FIGS. 18 and 20), the upper attachment portion 172 of the nozzle structure 170 is configured to attach to the open end portion of the piston 150 (at the bottom of the side wall 152 of the piston 150). For example, the upper attachment portion 172 of the nozzle structure 170 may extend either around the outside of or at least partially into the end of the side wall 152 of the piston 150 such that one of the nozzle structure 170 or the piston 150 extends partially within the other.

As shown in FIGS. 8-10 (and FIGS. 18 and 20), the central hollow portion, area, or passage 174 extends completely through the nozzle structure 170 and provides an area for the water to flow (from the piston 150) to flow through (and out from the nozzle structure 170 onto the user's hands). Due to the relatively long and narrow overall shape of the nozzle structure 170, the central passage 174 is also approximately cylindrical and relatively long and narrow along the horizontal plane.

As shown in FIGS. 8-10 and 13, the nozzles 176 of the nozzle structure 170 (e.g., a spout, hole, aperture, or orifice) extend from and through the bottom surface of the wall of the nozzle structure 170 (i.e., along the side of the nozzle structure 170 that is opposite the upper attachment portion 172 of the nozzle structure 170). Accordingly, liquid flows out from the central passage 174 and into and through the nozzles 176 due to gravity and subsequently exits out of the nozzle structure 170 (and the entire valve structure 100) through the nozzles 176. The nozzles 176 are positioned along the horizontal length of the central passage 174 (and the nozzle structure 170), which provides a relatively wide area of liquid coverage from the nozzles 176. There may be any number of nozzles 176, depending on the desired configuration of the nozzle structure 170. According to one embodiment, the nozzle structure 170 includes nine nozzles 176 positioned in a single row along the horizontal length of the nozzle structure 170.

Figure 13:
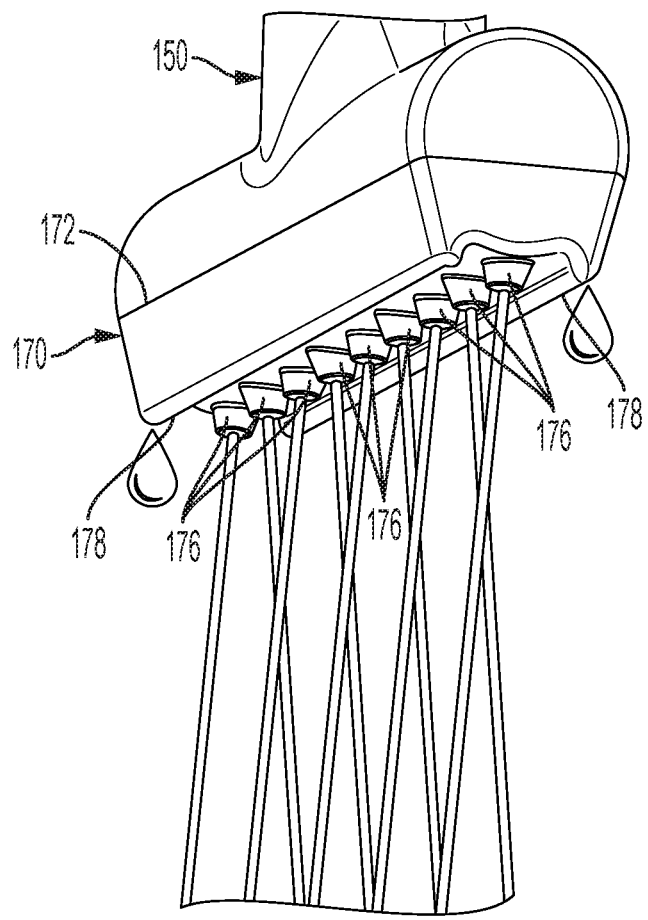
FIG. 13 is a portion of the valve structure of FIG. 5.

Each of the nozzles 176 are positioned at different angles from adjacent nozzles 176 in order to cover more area (of the user's hands, for example) with liquid and spread and disperse liquid over the user's hands more completely, while minimizing the required liquid flow rate. For example, as shown in FIG. 13, each of the nozzles 176 in the single row are alternatively angled forward and backward. This configuration of the nozzles 176 (i.e., the multiple small nozzles 176 positioned along the long horizontal length of the central passage 174 and at various angles) reduces the amount of water needed to wash and rinse the user's hands (while still adequately covering the user's hands), which allows the valve structure 100 to be have relatively low flow rate, thereby conserving water.

Due to the long shape and orientation of the central passage 174 and how the nozzles 176 are alternatively angled, it is difficult and not intuitive for the user to fill up drinking receptacles or vessels, which discourages and prevents the user from filling up drinking vessels (e.g., cups or water bottles) in the handwashing station 20. Accordingly, the water vessel 30 can be filled with water that is not necessarily drinkable, which provides more opportunity for the water vessel 30 to be refilled.

Additionally, the nozzle structure 170 includes at least one drip deflector 178 that prevents excess liquid from interfering with the flow through the nozzles 176. For example, as shown in FIG. 13, the nozzle structure 170 includes two drip deflectors 178 that extend along the entire horizontal length of the nozzle structure 170 on both sides of and along all of the nozzles 176. The drip deflectors 178 are the lowest point along the bottom surface of the nozzle structure 170 (from which the nozzles 176 extend from) such that excess liquid along the outside of the nozzle structure 170 moves to the drip deflectors 178 rather than toward the nozzles 176. For example, in order for excess water to reach the nozzles 176, the water would have to move upward along the horizontal width of the nozzle structure 170 to reach the nozzles 176 from the outside edges of the nozzle structure 170. Accordingly, the excess water instead drips off of the bottom surfaces of the drip deflectors 178. The drips may be from, for example, excess water that leaks from the outside of the piston 150 when the valve structure 100 is in the open position 104.

Control Structure

The control structure includes a rotational rod 182, a piston rod 184, and the handle structure 180 (and/or the foot pedal structure 190, as described further herein) in order to provide a mechanism for the user to control whether the valve structure 100 is in the closed position 102 or in the open position 104. As described further herein, by rotating the handle structure 180 upward (or by pressing down on the foot pedal 198, as described further herein), the user can move the valve structure 100 from the closed position 102 to the open position 104 in order to wash their hands.

The control structure (which includes the handle structure 180 and/or the foot pedal structure 190) is configured to move relative to the mounting structure and the water vessel 30 and is configured to move the dispensing structure at the same time relative to the mounting structure and the water vessel 30 as the valve structure 100 moves between the closed position 102 and the open position 104. The control structure is configured to be moved by pressure from a portion of the user's body (in particular a portion other than the user's hands, such as at least one of the user's wrist or foot) while the user's hands are underneath the dispensing structure in order to move the dispensing structure from the closed position 102 to the open position 104.

Handle Structure

The handle structure 180 is configured (and therefore positioned) to be lifted upward by a portion of the user's body other than their hand (i.e., their wrist) to move the dispensing structure from the closed position 102 to the open position 104. Accordingly, the handle structure 180 includes at least one lift arm 186 and a handle 188. The lift arms 186 connect and extend between the rotational rod 182, the piston rod 184, and the handle 188. Accordingly, the lift arms 186 are substantially perpendicular to the rotational rod 182, the piston rod 184, and the handle 188 (and the rotational rod 182, the piston rod 184, and the handle 188 are substantially parallel to each other). The lift arms 186 may include multiple different attachment notches or apertures 189 that provide an area to attach to the ends of each of the rotational rod 182 and the piston rod 184. According to one embodiment as shown in FIG. 8, the handle structure 180 includes two lift arms 186 that are positioned along both sides of the rotational rod 182, the piston rod 184, and the handle structure 180. Accordingly, pairs of attachment apertures 189 on the lift arms 186 may be aligned with each other in order to attach to each end of the rotational rod 182 and the piston rod 184. As shown in FIG. 8 (as well as FIGS. 17 and 19), the attachment apertures 189 for the piston rod 184 may be slots and have an oblong shape that extends at least partially along the length of the lift arms 186, which allows the piston rod 184 to move vertically with the piston 150 as the lift arms 186 are rotated about the rotational axis 181 (as shown in FIGS. 7 and 9-10) without causing strain within the valve structure 100.

As shown in FIGS. 9-10, the lift arms 186 horizontally space the handle 188 out away from the dispensing structure (in particular the nozzle structure 170) such that the user's hand can be positioned underneath the dispensing structure (in particular the nozzle structure 170) while the user's wrist is positioned under the handle 188 during use. This configuration allows the user to wet, wash, and rinse their hand under the nozzle structure 170 while keeping the valve structure in the open position 104 by pushing upward on the handle 188 with their wrist, as shown and described further herein. The lift arms 186 also vertically space the handle 188 away from and below the nozzle structure 170 while the valve structure 100 is in the closed position 102 (as shown in FIG. 9) such that, once the user lifts up the handle 188 to move the valve structure 100 into the open position 104, the user's hands are relatively close to (without hitting) the bottom of the nozzle structure 170.

The rotational rod 182 rotationally connects a back end of the lift arms 186 (i.e., the end opposite to the handle 188) to the lower mounting structure 130 (via the attachment apertures 139 on the control attachment portion 138 of the lower mounting structure 130). The handle structure 180 rotates about the rotational axis 181 (that extends along and is defined by the rotational rod 182 and is approximately horizontal) between the closed position 102 and the open position 104. The rotational rod 182 may be rotatably attached to at least one of the lower mounting structure 130 or the lift arms 186.

The central or piston rod 184 rotationally connects a middle portion of the lift arms 186 (i.e., a portion between the back end of the lift arms 186 and the handle 188) to the piston 150 (via the attachment apertures 159 on the side wall 152 of the piston 150). Accordingly, as the handle structure 180 rotates about the rotational axis 181, the handle structure 180 forces the piston 150 to slide up and down within the upper mounting structure 110 and the lower mounting structure 130 to open and close the valve structure 100. The piston rod 184 may be rotatably attached to at least one of the piston 150 or the lift arms 186. However, according to various embodiments, the handle structure 180 may not include the rotational rod 182 and/or the piston rod 184.

The handle 188 provides an area for the user to contact to move the valve structure 100 between the closed position 102 and the open position 104. For example, as described and shown further herein, the user may use one or both of their wrists to move or push the handle 188 upward and thereby move the valve structure 100 (in particular the dispensing structure) from the closed position 102 and into the open position 104 to wash their hands. The handle 188 extends between and connects the front ends of the lift arms 186 (such that the handle 188 and the rotational rod 182 are on opposite ends of the lift arms 186). The handle 188 may be rotationally or statically attached to the lift arms 186. Additionally, the handle 188 and the lift arms 186 may be separate attachable pieces or may be one integral piece that is constructed as a single-piece such that handle 188 and the lift arms 186 are a single unitary component that cannot be separated without destruction.

As shown in FIGS. 7-10, the handle structure 180 comprises a visual indicator 187 that provides a visual indication to the user of how to operate the valve structure 100. For example, the visual indicator 187 may be an arrow pointing upward, thereby indicating to the user to move the handle structure 180 upward to operate the valve structure 100. The visual indicator 187 may be positioned on a visually predominate area of the handle structure 180 (e.g., the front, top of the handle structure 180), in particular an area that the user should move to operate the valve structure 100 (e.g., the handle 188).

Valve Structure and Water Vessel Assembly

The valve structure 100 is configured to be attached or mounted to the water vessel 30. In order to attach the valve structure 100 to the water vessel 30, the hole 39 is first formed in the bottom of the water vessel 30. The hole 39 may be formed by drilling into the bottom of the water vessel 30 with a drill or, if the valve structure 100 includes the hole-perforation feature 119 (and optionally the centering feature 129), by aligning the centering feature 129 with the desired center of the hole 39 (to be formed) and then rotating or pressing the hole-perforation feature 119 of the upper mounting structure 110 of the valve structure 100 along or into (respectively) the wall 32 of the water vessel 30. The gasket 120 is positioned on the top of the base 134 of the lower mounting structure 130 (such that the gasket 120 is positioned around the upper attachment portion 132 of the lower mounting structure 130) or is positioned along the outer surface 38 of the water vessel 30 around the hole 39. The lower mounting structure 130 is then partially inserted into the hole 39 of the water vessel 30 such that the upper attachment portion 132 of the lower mounting structure 130 extends into the inner area 34 of the water vessel 30 (and the base 134 is positioned outside of the water vessel 30) and the gasket 120 is sandwiched between the outer surface 38 of the water vessel 30 and the top of the base 134 of the lower mounting structure 130. The upper mounting structure 110 is moved or positioned inside of the water vessel 30, and the fastener portion 112 of the upper mounting structure 110 is subsequently attached and tightened to the upper attachment portion 132 of the lower mounting structure 130 within the water vessel 30. The dispensing structure (i.e., the piston 150 (with the seal member 122 attached) and the nozzle structure 170) and the control structure (i.e., the handle structure 180 and/or the foot pedal structure 190) are attached to the lower mounting structure 130 before or after the lower mounting structure 130 and the upper mounting structure 110 are attached to each other.

According to one embodiment (as shown in FIGS. 9-10), the fastener portion 112 of the upper mounting structure 110 and the upper attachment portion 132 of the lower mounting structure 130 are attached to each other by a threaded attachment by screwing the internal threads 115 of the upper mounting structure 110 onto the external threads 135 of the lower mounting structure 130. Alternatively, the fastener portion 112 of the upper mounting structure 110 and the upper attachment portion 132 of the lower mounting structure 130 may be attached to each other through a form-fit attachment by pressing the fastener portion 112 of the upper mounting structure 110 (without any threads) tightly over the upper attachment portion 132 of the lower mounting structure 130 (without any threads).

Valve Structure Operation

Figure 16:
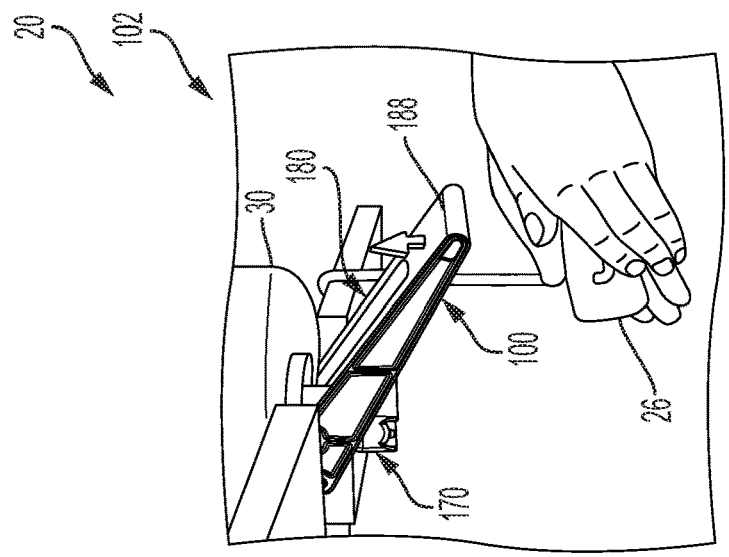
FIGS. 14-16 are perspective views of the handwashing station of FIG. 5 being used.
Figure 15:
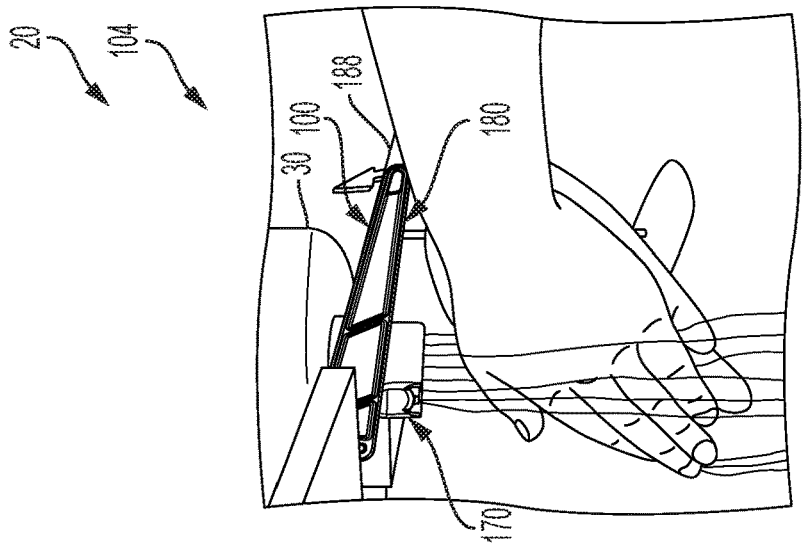
Figure 14:
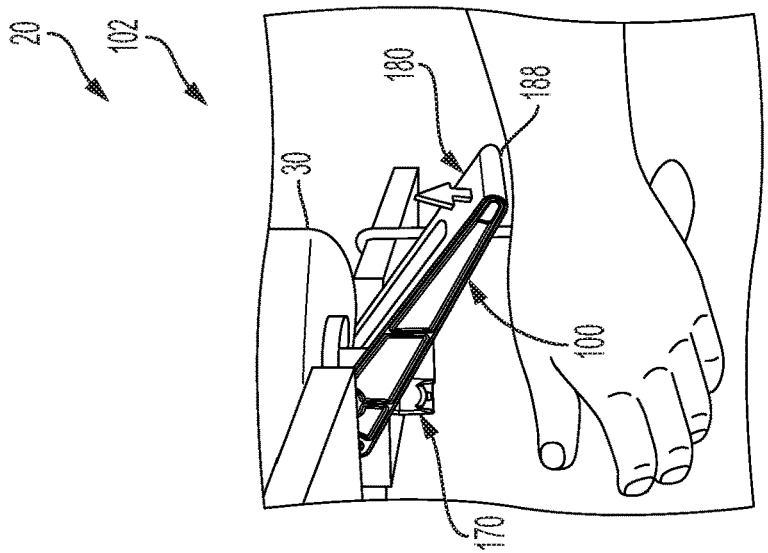

Once the valve structure 100 has been attached to the water vessel 30, the valve structure 100 may be used. FIGS. 14-16 show operation of the handwashing station 20 by using the handle structure 180. However, as described further herein, the handwashing station 20 may alternatively or additionally be operated with the foot pedal structure 190, depending on the configuration of the valve structure 100.

In order to use the valve structure 100 that is attached to the water vessel 30, the water vessel 30 is first filled with a liquid (e.g., water). Once the water vessel 30 contains the liquid, users can then use the handwashing station 20 to wash their hands, as shown in FIGS. 14-16. First, as shown in FIG. 14, the user moves at least one of their hands underneath the nozzle structure 170 of the valve structure 100 and at least one of their wrists underneath the handle 188 while the valve structure 100 is in the closed position 102. The user then uses their wrist to activate or operate the valve structure 100 by moving the handle 188 upward with their wrist (as shown in FIG. 15), which moves the valve structure 100 (and thus the dispensing structure) from the closed position 102 to the open position 104 and thus allows liquid to flow out of the water vessel 30, through the valve structure 100, out from the valve structure 100 through the nozzle structure 170, and onto the user's hand(s). While the user's wrist(s) is pushing up the handle 188, the user can wet, wash, or rinse their hand(s) (as shown in FIG. 15). Once the user lowers their wrist(s) or moves their wrists away from the handle 188 once they are done or in order to soap their hands, for example (as shown in FIG. 16), the handle 188 automatically moves downward due to the self-closing configuration of the valve structure 100 (as described further herein), which moves the valve structure 100 back into the closed position 102 and prevents any liquid from being dispensed from the water vessel 30 through the valve structure 100.

The user may activate and use the valve structure 100 (i.e., move the valve structure 100 into and keep the valve structure 100 in the open position 104) with any side of their wrist (e.g., the underside, the sides, or the topside of the wrist). Additionally, the user may move and rotate their hand(s) around while the liquid is being dispensed and the user's wrist or arm is still pressing the handle structure 180 up in order to fully wet or rinse their hands.

Figure 18:
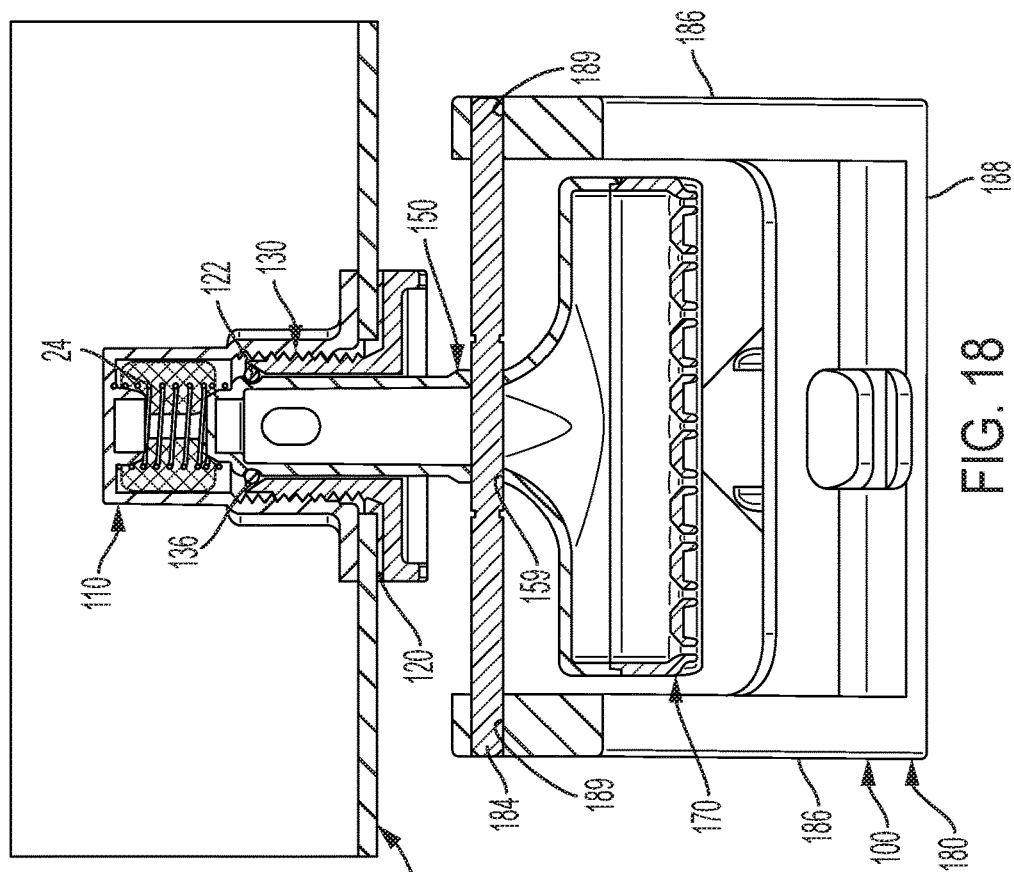
FIG. 18 is a cross-sectional view through Section A-A of FIG. 17.
Figure 17:
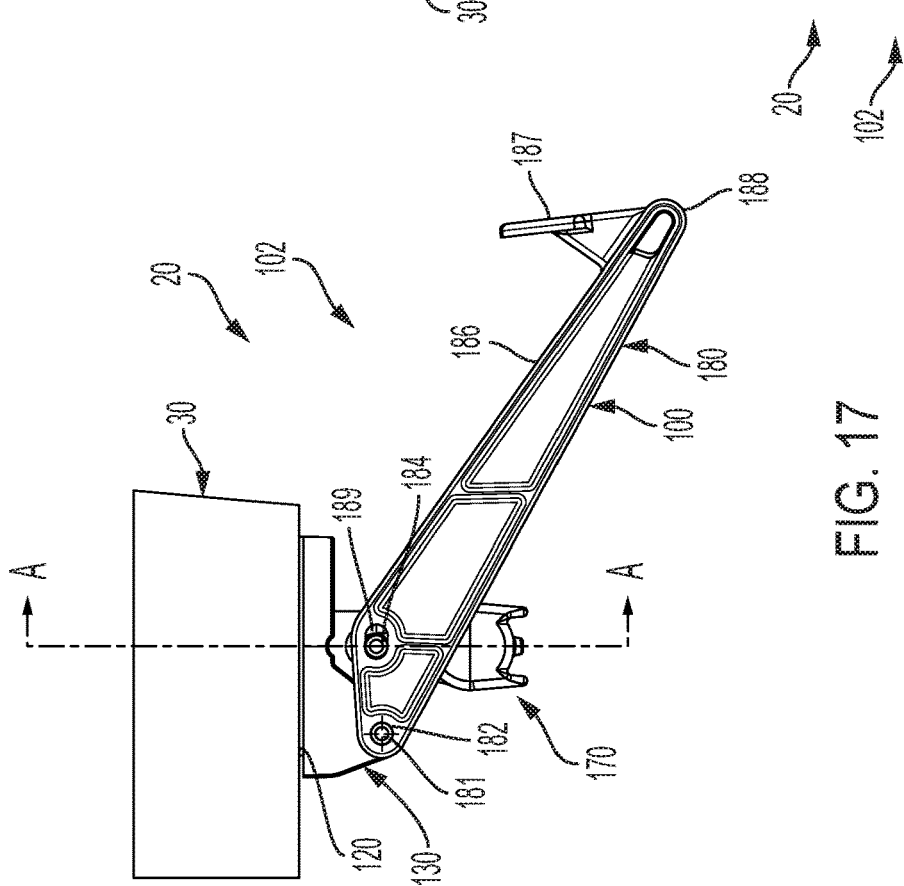
FIG. 17 is a side view of the valve structure in the closed position and the water vessel of FIG. 5.

FIGS. 17-20 show how the various components of the valve structure 100 are positioned and move as the valve structure 100 is moved between the closed position 102 and the open position 104. More specifically, in the closed position 102 (as shown in FIGS. 17-18), the lift arms 186 are angled downward from the rotational rod 182 such that the handle 188 is vertically lower than the rotational rod 182 (as shown in FIG. 17). Accordingly, the handle structure 180 pulls the piston 150 downward through the piston rod 184 such that the piston 150 is relatively low within the central passage 136 of the lower mounting structure 130, which closes off the valve structure 100. More specifically, due to the position of the piston 150, the seal member 122 is sealed to the top of the central passage 136 of the lower mounting structure 130, which prevents any liquid from the water vessel 30 from moving into the piston 150 through the flow aperture 154 of the piston 150 (and prevents the piston 150 from moving out of the lower mounting structure 130), thereby preventing liquid from moving through the valve structure 100 at all, as shown in FIG. 18.

In order to move the valve structure 100 from the closed position 102 to the open position 104, the user first lifts or raises the handle 188 with their wrist(s), which pivots the handle structure 180 about the rotational axis 181 (that extends along the length of the rotational rod 182) relative to the lower mounting structure 130 (and the water vessel 30). By rotating the handle 188 upward about the rotational axis 181, the lift arms 186 move the piston rod 184 vertically upward (since the piston rod 184 is on the same side of the rotational axis 181 as the handle 188). Since the piston rod 184 is attached to the piston 150, this movement of the piston rod 184 forces the piston 150 to move upward within the central passage 136 of the lower mounting structure 130, which lifts the seal member 122 off of the top of the central passage 136 of the lower mounting structure 130 and breaks the top seal, thereby allowing liquid to enter into the piston 150 through the flow apertures 154, through the rest of the valve structure 100, and out of the valve structure 100, onto the user's hands. As the handle structure 180 is moved, the rotational rod 182 may rotate relative to at least one of the lift arms 186 and the lower mounting structure 130, the piston rod 184 may rotate relative to at least one of the lift arms 186 and the piston 150, and the handle 188 may optionally rotate relative to the lift arms 186.

Figure 20:
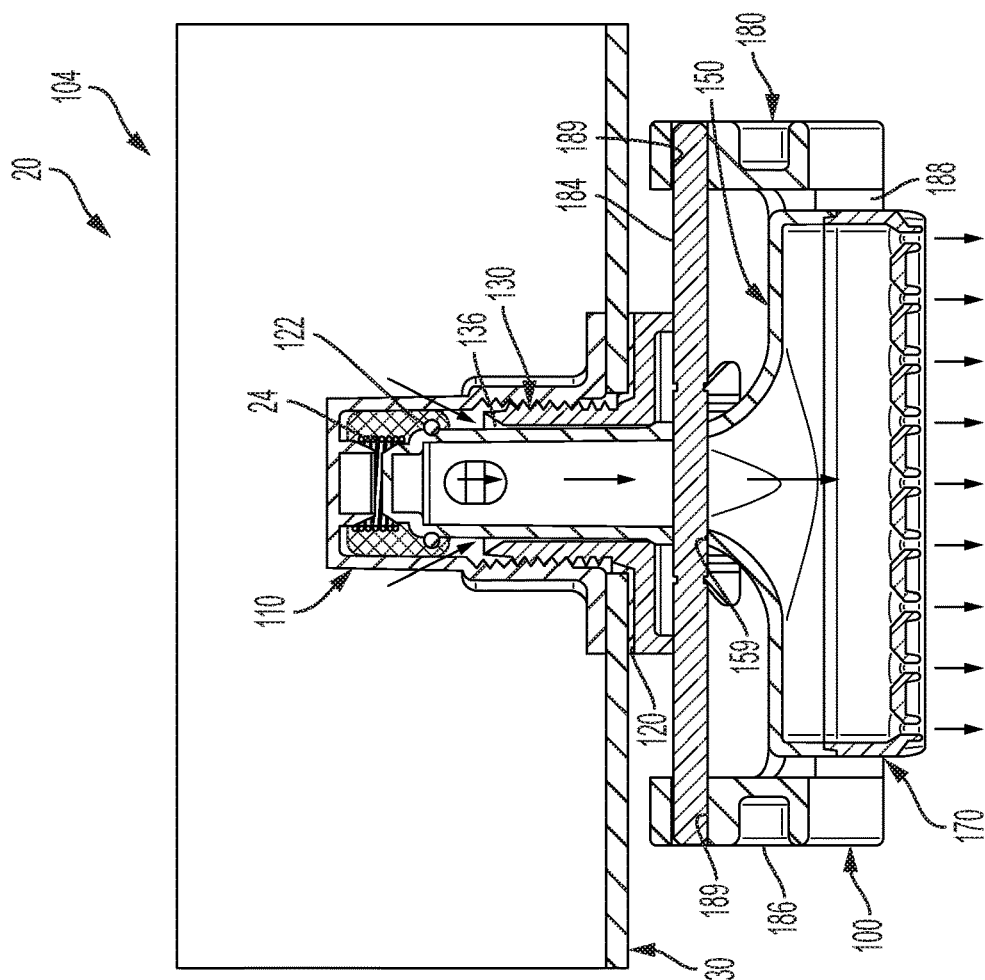
FIG. 20 is a cross-sectional view through Section B-B of FIG. 19.
Figure 19:
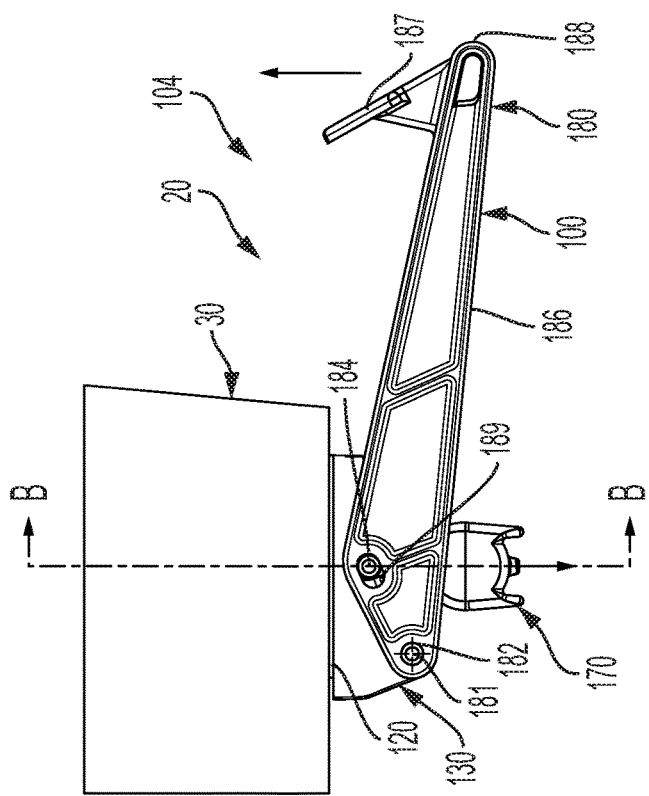
FIG. 19 is a side view of the valve structure in the open position and the water vessel of FIG. 5.

In the open position 104 (as shown in FIGS. 19-20), the lift arms 186 are angled upward (relative to the closed position 102) and may be at approximately the same height as the rotational rod 182 (as shown in FIG. 19). Accordingly, the handle structure 180 lifts the piston rod 184 upward, which pulls the piston 150 up relatively high within the central passage 136 of the lower mounting structure 130 and thus opens the valve structure 100. More specifically, due to the position of the piston 150, the seal member 122 is separated from (and not sealed to) the top of the central passage 136 of the lower mounting structure 130, which allows liquid from the water vessel 30 to move into the piston 150 through the flow aperture 154 of the piston 150, as shown in FIG. 20. Accordingly, liquid from the water vessel 30 flows through the filter 116, into the piston 150 through the flow aperture 154 of the piston 150, downward through the open end of the piston 150, into the nozzle structure 170 through the upper attachment portion 172, out from the nozzle structure 170 (thereby exiting the entire valve structure 100) through the nozzles 176, and onto the user's hands.

Self-Closing Feature of the Valve Structure

In order to conserve water and prevent the water from needlessly running, the valve structure 100 is self-closing and automatically stops the flow of liquid through the valve structure 100 (and thus moves from the open position 104 to the closed position 102) once the user has stopped pressing the handle 188 upward and has moved their wrist away from the handle 188 (e.g., once the user has finished washing their hands, while the user is scrubbing their hands with soap, or between uses). Both the weight of the liquid within the water vessel 30 and the weight distribution of the valve structure 100 cause the valve structure 100 to be biased to move into the closed position 102.

More specifically, the weight of the liquid within the water vessel 30 pushes or presses downward on the upper wall 158 of the piston 150, which presses the entire piston 150 downward within the central passage 136 of the lower mounting structure 130. This downward motion of the piston 150 forces the seal member 122 to firmly seal with the top of the central passage 136 and thereby prevents any liquid from flowing from the water vessel 30 into the piston 150 (through the flow aperture 154), which thus moves the valve structure 100 into the closed position 102.

The weight distribution of the valve structure 100 also biases the valve structure 100 to move into the closed position 102. More specifically, since the rotational rod 182 is attached to the back end of the lift arms 186 (i.e., the end of the lift arms 186 that is opposite the handle 188, which is along the front end of the lift arms 186), the majority of the weight of the lift arms 186 as well as the weight of the handle 188 is positioned along one side of the rotational rod 182 along the lift arms 186. Accordingly, the front end of the lift arms 186 (i.e., the end of the lift arms 186 corresponding to the handle 188) is biased to rotate downward about the rotational axis 181 that extends along the length of the rotational rod 182. Since the piston rod 184 is attached to the lift arms 186 along the same side of the rotational rod 182 as the front end of the lift arms 186, the lift arms 186 pull the piston rod 184 downward within the central passage 136 of the lower mounting structure 130 as the handle structure 180 rotates downward about the rotational axis 181 due to the weight of the handle structure 180. This downward motion of the piston 150 also forces the seal member 122 to firmly seal with the top of the central passage 136 and thereby prevents any liquid from flowing from the water vessel 30 into the piston 150 (through the flow aperture 154), which thus moves the valve structure 100 into the closed position 102 (similar to the effect of the weight of the liquid within the water vessel 30).

As shown in FIGS. 9-10 and as described further herein, the valve structure 100 may include the spring 124 which further assists in biasing the valve structure 100 to move into the closed position 102 (in addition to the weight of the liquid within the water vessel 30 and the weight distribution of the valve structure 100). More specifically, since the spring 124 is positioned between the bottom surface of the upper wall 118 of the upper mounting structure 110 and the top surface of the upper wall 158 of the piston 150, the spring 124 pushes the upper wall 158 of the piston 150 downward through the central passage 136 of the lower mounting structure 130, away from the upper wall 118 of the upper mounting structure 110. Accordingly, the piston 150 is moved downward within the central passage 136 of the lower mounting structure 130. This downward motion of the piston 150 also forces the seal member 122 to firmly seal with the top of the central passage 136 and thereby prevents any liquid from flowing from the water vessel 30 into the piston 150 (through the flow aperture 154), which thus moves the valve structure 100 into the closed position 102 (similar to the effect of the weight of the liquid within the water vessel 30). However, according to another embodiment, the valve structure 100 does not include the spring 124 and instead relies on the weight of the liquid within the water vessel 30 and the weight distribution of the handle structure 180 to cause the valve structure 100 to be biased toward the closed position 102.

Foot Pedal Structure

According to various embodiments as shown in FIGS. 21-26, the control structure may include a foot pedal structure 190 (in addition to or instead of the handle structure 180) in order to allow the user to use their foot to operate and activate the valve structure 100.

Figure 21:
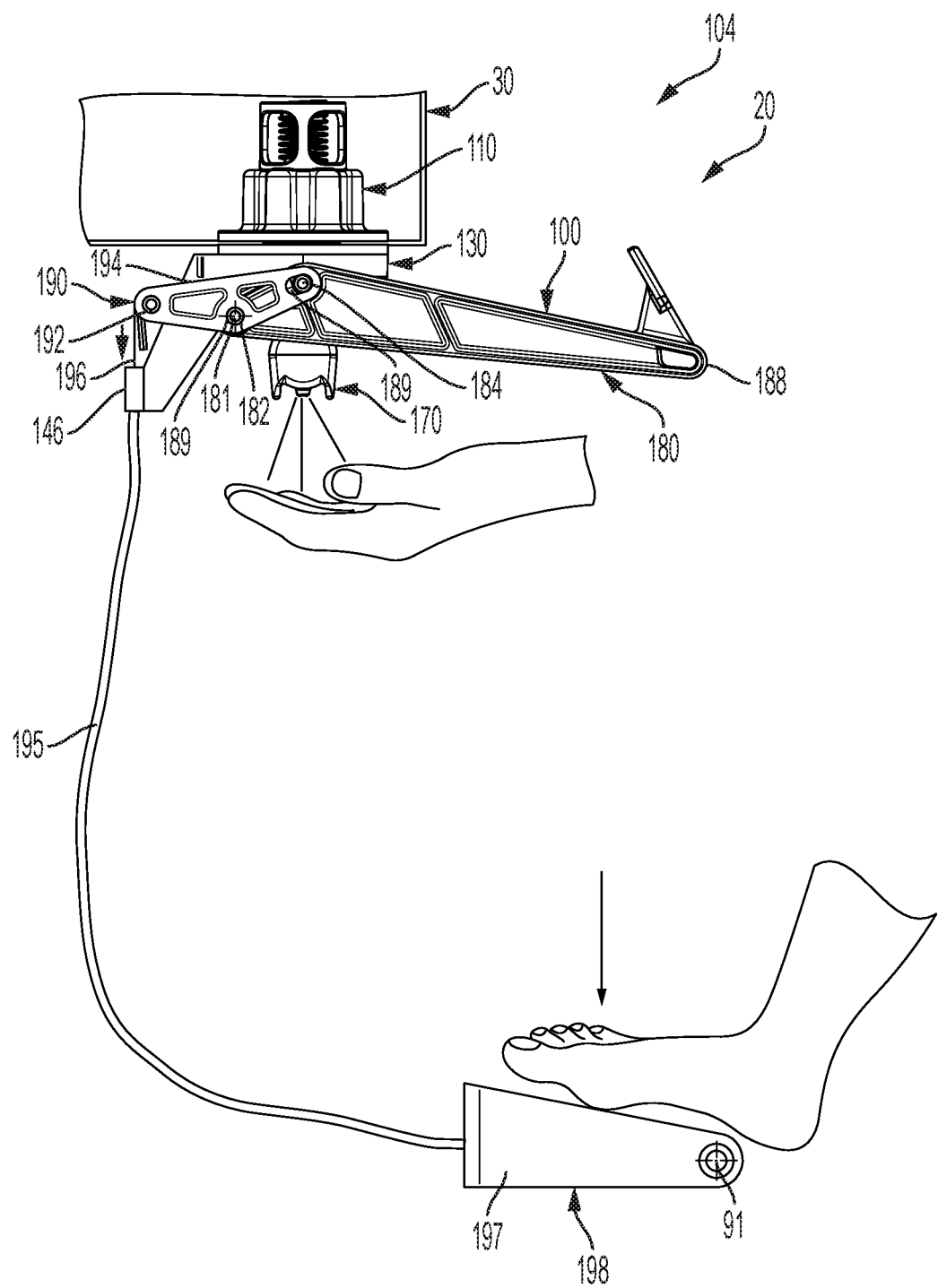
FIG. 21 is a side, partially cross-sectional view of a valve structure according to another embodiment in an open position.

According to one embodiment as shown in FIG. 21, the control structure includes both the handle structure 180 and the foot pedal structure 190 and accordingly can be activated and operated with the handle structure 180 (with the user's wrist) and/or the foot pedal structure 190 (with the user's foot), depending on the user's preference, to move the dispensing structure from the closed position 102 to the open position 104. According to another embodiment as shown in FIGS. 22-23, the valve structure 100 includes the foot pedal structure 190 (and not the handle structure 180) and accordingly is activated and operated only with the foot pedal structure 190 (with the user's foot). According to another embodiment as shown in FIG. 7 and as described further herein, the control structure includes the handle structure 180 (and not the foot pedal structure 190) and accordingly is activated and operated only with the handle structure 180 (with the user's wrist).

While the handle structure 180 is configured to be operated by the user's wrist (or a portion of their arm), the foot pedal structure 190 is configured to be operated by the user's foot. Accordingly, the foot pedal structure 190 includes a lever 194, a cable 196, a cable housing 195, and a foot pedal 198.

Figure 26:
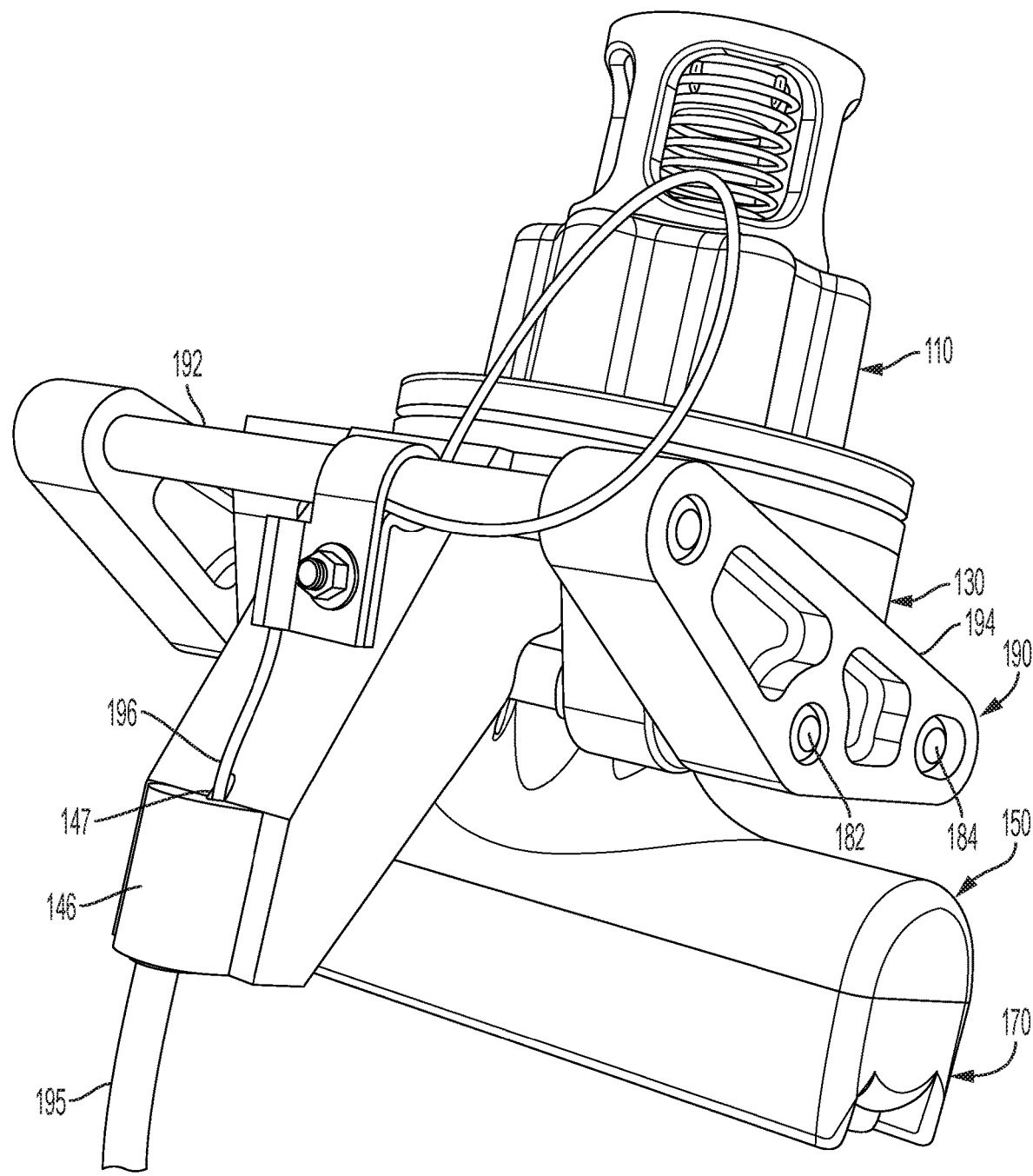
FIG. 26 is a perspective view of the valve structure of FIG. 22.

As shown in FIG. 26, the lever 194 may include two substantially symmetrical lever components on opposite sides of the lower mounting structure 130 and a pull rod 192 extending between and connecting the two lever components. Similar to the lift arms 186, the lever 194 also includes respective pairs of attachment apertures 189 along the lever components that are configured to receive the rotational rod 182 and the piston rod 184. The attachment apertures 189 of the lever 194 may be configured in a similar manner as the attachment apertures 189 of the lift arms 186, and the rotational rod 182 and the piston rod 184 are attached to the lever 194 in a similar manner as the lift arms 186, as described further herein.

As shown in FIGS. 21-23, a back portion of the lever 194 extends behind the rotational rod 182 and the pull rod 192 (as further shown in FIG. 26) statically connects the two lever components along the back portion of the lever 194. The pull rod 192 is positioned on an opposite side of the rotational rod 182 as the piston rod 184 (such that the rotational rod 182 is positioned in between the pull rod 192 and the piston rod 184 along the length of the lift arm 186).

As shown in FIGS. 21-23, the lever 194 is a separate component from the handle structure 180. However, according to another embodiment, the lever 194 may optionally be statically attached to a portion of the handle structure 180, such as the lift arms 186, such that the lever 194 and the handle structure 180 move congruently together. In particular, the lever 194 may extend from the back end of the lift arm(s) 186 (i.e., along a side of the rotational rod 182 that is opposite the piston rod 184).

Figure 24:
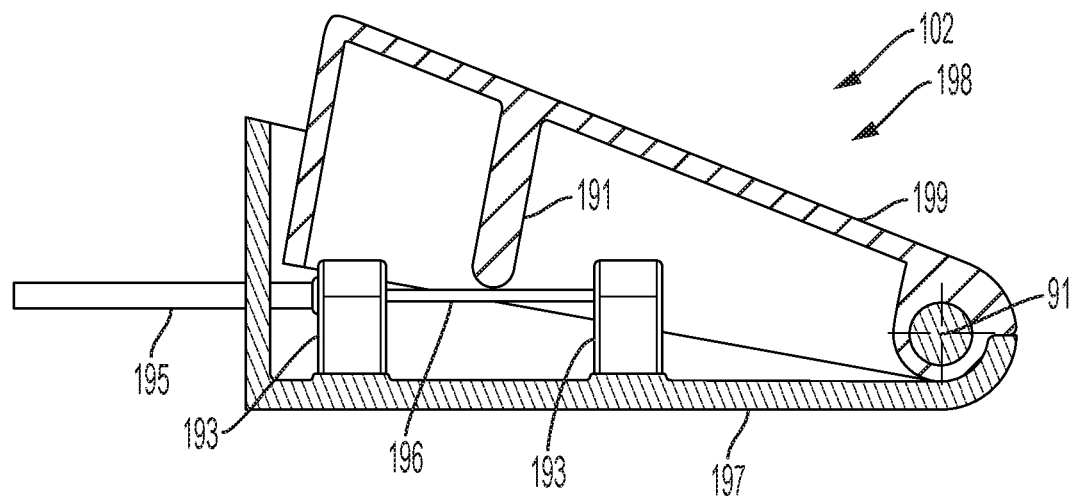
FIG. 24 is a side, cross-sectional view of the foot pedal of FIG. 22 in the closed position.
Figure 25:
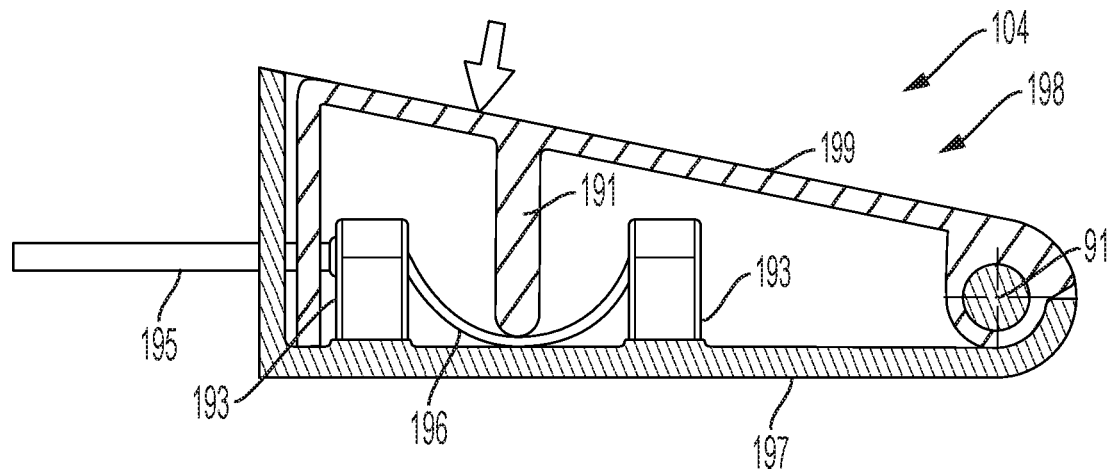
FIG. 25 is a side, cross-sectional view of the foot pedal of FIG. 22 in the open position.

The cable 196 extends between and movably connects the lever 194 and the foot pedal 198. In particular, a top end of the string, rope, or cable 196 is attached to the pull rod 192 of the lever 194 (as shown in FIG. 26), and a bottom end of the cable 196 is attached to an inner area of the foot pedal 198, such as the second one of the cable supports 193 (as shown in FIGS. 24-25). A middle portion of the cable 196 is positioned and movable within the cable housing 195.

With the foot pedal structure 190, the lower mounting structure 130 includes an extension with a stop 146 and an aperture 147 extending completely through the stop 146 (as shown in FIG. 26) in order to guide the cable 196 and provide an area to secure the cable housing 195 to allow the foot pedal 198 to properly function. The stop 146 prevents the cable housing 195 from moving while the cable 196 is moved within the cable housing 195. The stop 146 and its aperture 147 are positioned between the pull rod 192 and the foot pedal 198, preferably near and directly beneath the pull rod 192. The cable 196 extends completely through and is movable within the aperture 147.

The cable housing 195 is configured to receive a middle portion of the cable 196 and extends between the stop 146 and a portion of the foot pedal 198 before the first cable support 193 (along the length of the cable 196). The cable housing 195 cannot move completely through the aperture 147 and cannot significantly move relative to the stop 146 and the foot pedal 198. The cable 196 is positioned within the cable housing 195 and extends beyond both ends of the cable housing 195 in order to attach to the pull rod 192 along its upper end and an inner portion (e.g., the second cable support 193) of the foot pedal 198 along its lower end.

As shown in FIGS. 22-23, the foot pedal 198 includes a base 197 and a movable platform 199. The base 197 is positioned on the ground or lower surface, and the movable platform 199 is movably attached to the base 197. As shown in FIGS. 24-25, the movable platform 199 is movably or pivotably attached to the base 197 along one lower edge or side of the movable platform 199 and is configured to rotate relative to the base 197 about a rotational axis 91 that extends through the lower edge of the movable platform 199.

As shown in FIGS. 24-25, the base 197 includes two cable supports 193 that extend upwardly from an upper surface of a bottom wall of the base 197. The first cable support 193 is positioned is closer to the end of the cable housing 195 along the length of the cable 196, and the second cable support 193 is positioned further from the end of the cable housing 195 along the length of the cable 196. The cable 196 movably extends through or within the first cable support 193 and is statically attached to the second cable support 193. The two cable support 193 may be at approximately the same height as each other with the cable 196 (without the cable housing 195) extending between the two cable supports 193.

As further shown in FIGS. 24-25, the movable platform 199 includes an extension 191 that extends downwardly from a bottom surface of a top wall of the movable platform 199. The extension 191 is positioned such that, in the closed position 102 (as shown in FIG. 24), the extension 191 is above and does not extend into the area that the cable 196 extends along between the two cable supports 193. Accordingly, in the closed position 102, the cable 196 extends in a substantially straight line between the two cable supports 193. In the open position 104 (as shown in FIG. 25), however, the extension 191 moves to an area in between the two cable supports 193 and thus into the area that the cable 196 extends along between the two cable supports 193. Accordingly, in the open position 104, the extension 191 bends the portion of the cable 196 that is between the two cable supports 193.

In order to operate the valve structure 100 with the foot pedal structure and to move the valve structure 100 from the closed position 102 (as shown in FIGS. 22 and 24) to the open position 104 (as shown in FIGS. 23 and 25), the user pushes (and thus moves) the top surface of the top wall of the movable platform 199 downward toward and relative to the base 197 with their foot, which moves the extension 191 of the movable platform 199 downward toward the portion of the cable 196 that is within the foot pedal 198 and between the two cable supports 193. The extension 191 thus bends the cable 196, which pulls more of the cable 196 into the foot pedal 198 and effectively shortens the length of the cable 196 that is between the foot pedal 198 and the pull rod 192. Thus, the cable 196 is pulled downward, which pulls the pull rod 192 and therefore the back of the lever 194 downward. By pulling the back of the lever 194 of downward, the lever 194 rotates about the rotational axis 181 that extends through the rotational rod 182, which lifts the piston rod 184 (and therefore the piston 150) and thus moves the valve structure 100 from the closed position 102 into the open position 104 (as described further herein). When the user lifts their foot off of the foot pedal 198, the valve structure 100 automatically moves from the open position 104 to the closed position 102 due to the self-closing configuration of the valve structure 100, as described further herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the handwashing valve structure as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the disclosure.

Other substitutions, modifications, changes and omissions may also be made in the design, operating conditions and arrangement of the various exemplary embodiments without departing from the scope of the present disclosure. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the disclosure.

What is claimed is:

1. A handwashing valve structure comprising:
   a dispenser attachable to a liquid vessel to dispense a liquid from the liquid vessel and movable between a closed position in which liquid cannot flow through the valve structure and an open position in which liquid flows from the liquid vessel and through and out from the valve structure;
   a mounting structure attachable to the liquid vessel to attach the dispenser to the liquid vessel and comprising a lower mounting structure through which the at least a portion of the dispenser extends; and a controller directly rotatably coupled to both the dispenser and the lower mounting structure of the mounting structure to move the dispenser between the closed position and the open position, wherein the controller is movable relative to the dispenser, wherein the controller is movable by pressure from a portion of a user's body to move the dispenser from the closed position to the open position, wherein the dispenser is automatically movable from the open position to the closed position in the absence of any pressure from the portion of the user's body onto the controller.

2. The handwashing valve structure of claim 1, wherein the controller is positioned relative to the dispenser such that movement of the controller is directly correlated to movement of at least one of the user's wrist or foot toward the controller while the user's hands are underneath the dispenser to move the dispenser from the closed position to the open position.

3. The handwashing valve structure of claim 1, wherein the controller is movable by pressure from a portion of the user's body other than the user's hands while the user's hands are underneath the dispenser to move the dispenser from the closed position to the open position.

4. The handwashing valve structure of claim 1, wherein the dispenser is movable between the closed position and the open position by only mechanical mechanisms and without any electrical assistance.

5. The handwashing valve structure of claim 1, wherein the mounting structure is extendable at least partially through an aperture in a wall of the liquid vessel.

6. The handwashing valve structure of claim 5, wherein the mounting structure comprises an upper mounting structure, wherein the upper mounting structure and the lower mounting structure sandwich at least a portion of the wall of the liquid vessel and attach to each other.

7. The handwashing valve structure of claim 6, wherein the mounting structure comprises a filter.

8. The handwashing valve structure of claim 5, wherein the mounting structure comprises a hole-perforation feature that cuts the aperture in the wall of the liquid vessel.

9. The handwashing valve structure of claim 1, wherein the dispenser comprises a piston that is movable by the controller within the a portion of the valve structure in order to prevent or allow the flow of fluid through the handwashing valve structure.

10. The handwashing valve structure of claim 1, further comprising a spring, the spring positioned between the mounting structure and the controller and biasing the dispenser to move from the open position to the closed position.

11. The handwashing valve structure of claim 1, wherein the dispenser comprises a nozzle structure with a horizontal length and a horizontal width, wherein the horizontal length is substantially larger than the horizontal width.

12. The handwashing valve structure of claim 11, wherein the nozzle structure comprises a plurality of nozzles positioned along the horizontal length of the nozzle structure.

13. The handwashing valve structure of claim 12, wherein each of the nozzles of the plurality of nozzles are positioned at different angles from adjacent nozzles.

14. The handwashing valve structure of claim 12, wherein the nozzle structure comprises at least one drip deflector that extends along the horizontal length of the nozzle structure and along all of the plurality of nozzles.

15. The handwashing valve structure of claim 1, wherein the controller comprises a handle that is liftable upward by the user's wrist to move the dispenser from the closed position to the open position.

16. The handwashing valve structure of claim 15, wherein the handle includes at least one lift arm and a handle portion, wherein the at least one lift arm horizontally spaces the handle portion out from the dispenser.

17. A handwashing station comprising:

a liquid vessel for containing a liquid; and a handwashing valve structure attachable to the liquid vessel to dispense the liquid from the liquid vessel, the valve structure comprising a dispenser attachable to the liquid vessel to dispense a liquid from the liquid vessel and movable between a closed position in which liquid cannot flow through the valve structure and an open position in which liquid flows from the liquid vessel and through and out from the valve structure, a mounting structure attachable to the liquid vessel to attach the dispenser to the liquid vessel and comprising a lower mounting structure through which the at least a portion of the dispenser extends, and a controller directly rotatably coupled to both the dispenser and the lower mounting structure of the mounting structure to move the dispenser between the closed position and the open position, wherein the controller is movable relative to the dispenser, wherein the controller is movable by pressure from a portion of a user's body to move the dispenser from the closed position to the open position, wherein the dispenser is automatically movable from the open position to the closed position in the absence of any pressure from the portion of the user's body onto the controller.

18. The handwashing station of claim 17, wherein the controller is movable by pressure from at least one of the user's wrist or foot while the user's hands are underneath the dispenser to move the dispenser from the closed position to the open position.

19. The handwashing station of claim 17, wherein the controller is movable by pressure from a portion of the user's body other than the user's hands while the user's hands are underneath the dispenser to move the dispenser from the closed position to the open position.

20. The handwashing station of claim 17, wherein the dispenser is movable between the closed position and the open position by only mechanical mechanisms and without any electrical assistance.

21. The handwashing valve structure of claim 1, wherein the dispenser continually dispenses the liquid from the liquid vessel in the open position.

* * * * *